(12) United States Patent  
Suga

(10) Patent No.: US 7,093,945 B2  
(45) Date of Patent: Aug. 22, 2006

(54) IMAGING APPARATUS FOR ENDOSCOPES

(75) Inventor: Takeshi Suga, Hachioji (JP)

(73) Assignee: Olympus Corporation, Tokyo (JP)

( * ) Notice: Subject to any disclaimer, the term of this patent is extended or adjusted under 35 U.S.C. 154(b) by 121 days.

(21) Appl. No.: 10/846,665

(22) Filed: May 17, 2004

(65) Prior Publication Data

US 2004/0233538 A1 Nov. 25, 2004

(30) Foreign Application Priority Data

May 20, 2003 (JP) .............................. 2003-141889

(51) Int. Cl.
*G02B 27/00* (2006.01)
(52) U.S. Cl. .................. 359/614; 359/819; 359/738
(58) Field of Classification Search ............... 359/614, 359/819

See application file for complete search history.

(56) References Cited

U.S. PATENT DOCUMENTS 5,353,070 A * 10/1994 Mitani et al. ............... 348/781

2002/0186478 A1* 12/2002 Watanabe et al. ........... 359/819

FOREIGN PATENT DOCUMENTS

| JP | 62172319 A | * | 7/1987 |
|---|---|---|---|
| JP | 09-070384 | | 3/1997 |
| JP | 11-223726 | | 8/1999 |
| JP | 2002-010969 | | 1/2002 |
| JP | 2002-153414 | | 5/2002 |
| JP | 2003131108 A | * | 5/2003 |

* cited by examiner

*Primary Examiner*—Mark A. Robinson
*Assistant Examiner*—Mark Consilvio
(74) *Attorney, Agent, or Firm*—Kenyon & Kenyon LLP

(57) ABSTRACT

An imaging apparatus for endoscopes has an objective optical system forming an image of an object and a holding frame retaining the objective optical system. The objective optical system is provided with optical filters which reduce a transmittance in a particular wavelength region of illumination light irradiating the object to 0.1% or less and has a light passage preventing device blocking light passing through a clearance between the outside surfaces of the optical filters and the inside surface of the holding frame retaining the optical filters.

16 Claims, 18 Drawing Sheets

IMAGING APPARATUS FOR ENDOSCOPES

BACKGROUND OF THE INVENTION

1. Field of the Invention

This invention relates to an imaging apparatus for endoscopes in which an objective optical system is provided with optical filters which reduce a transmittance in a particular wavelength region of illumination light irradiating an object to 0.1% or less, and in particular, to an imaging apparatus for endoscopes in which illumination light irradiating an object is excitation light inducing fluorescent light and an objective optical system is provided with fluorescence observing optical filters which reduce a transmittance in the wavelength region of the excitation light to 0.1% or less.

2. Description of Related Art

Recent developments have involved the use of techniques that auto-fluorescence from a living body or fluorescence of medicine administered to the living body is detected as a two-dimensional image by an endoscope, and states of the degeneration of a biochemical tissue and a disease, such as cancer, (for example, the kind of disease and a penetration area) are diagnosed from this fluorescent image.

FIG. 1 shows one conventional example of an endoscope system for observing fluorescence. The endoscope system of this example includes an endoscope 21, a signal processing means 22, a light source means 23, and a monitor 24. Excitation light from the light source means 23 is conducted to a distal end portion 25 of the endoscope 21 to irradiate a living body, not shown. Fluorescent light emanating from the living body is imaged by an imaging apparatus for endoscopes placed at the distal end portion 25 and its electric signal is converted by the signal processing means 22 so that an image can be observed through the monitor 24.

Conventional examples of endoscopes for observing fluorescence are set forth, for instance, in Japanese Patent Kokai Nos. Hei 9-70384, 2002-153414, and 2002-10969.

As disclosed in these prior art articles, fluorescent light, in contrast with excitation light, is very faint, and thus, to observe the fluorescent light, it is necessary that an optical filter which cuts off the excitation light and transmits the fluorescent light is placed in an objective optical system of the imaging apparatus for endoscopes.

Japanese Patent Kokai No. Hei 11-223726 discloses an interference film filter in which the transmittance of excitation light is 0.1% or less and suggests that since excitation light incident on the filter is sufficiently cut off with respect to fluorescent light, a fluorescent image of good contrast is obtained.

The conventional examples, however, fail to describe the fact that excitation light passes through a mechanical clearance between the optical filter cutting off the excitation light and a holding frame retaining the optical filter and the observation is seriously affected, and provision for this.

An example of a common objective optical system in the imaging apparatus for endoscopes of this type is illustrated in FIG. 2. In the objective optical system of an imaging apparatus 14 for endoscopes in FIG. 2, lenses L1, L2, L3, and L4; optical filters F1, F2, F3, F4, and F5; stops 7, 8, 9, 10, and 11; and spacer rings 4, 5, and 6 are incased in a lens frame 1 so that the outside surface of the lens L1 and the inside surface of the lens frame 1 are fixed by cementation and the outside surface of the filter F5 and the inside surface of the lens frame 1 are also fixed by cementation. Thus, a clearance is necessarily provided between the outside surfaces of other lenses, other optical filters, the stops, and the spacer rings and the inside surface of the lens frame 1. Also, in FIG. 2, reference numeral 2 denotes a solid-state image sensor frame, symbol F6 denotes a filter or cover glass, and numeral 3 denotes a solid-state image sensor.

FIG. 3 shows one example of a course where excitation light passes through the clearance between the optical filers and the lens frame in FIG. 2. In FIG. 3, the lens frame and the solid-state image sensor frame are omitted. Rays of light refracted in the proximity of the periphery of the image-side curved surface of the lens L2 are nearly parallel with the optical axis of the objective optical system and attain heights corresponding to the outside diameters of the optical filters. The rays travel in straight lines through the clearance between the outside surfaces of the optical filters F2–F4, the stops 8–11, and the spacer rings 4 and 5 and the inside surface of the lens frame retaining them and are refracted by the lenses L3 and L4, reaching the solid-state image sensor 3. Since this propagation light travels in straight lines without undergoing reflection and absorption by the lens frame and the spacer rings, the amount of light is not diminished. However, when one of the optical filters F2–F4 is placed as an excitation light cutoff filter, the rays refracted in the proximity of the periphery of the image-side curved surface of the lens L2 miss the optical filters and pass through the clearance, and thus excitation light to be originally cut off reaches the solid-state image sensor. Consequently, the contrast of the fluorescent image is deteriorated and the observation is obstructed.

For example, when the outside diameters of the optical filters F2–F4, the stops 8–11, and the spacer rings 4 and 5 are assumed to be 2 mm, the inside diameter of the lens frame retaining the optical filters is set to approximately 2.05 mm, allowing for an insertion of them into the lens frame 1. When the inside diameters of the aperture stops are 0.96 mm, the area of the clearance is 20% of the area of the inside diameter of each of the aperture stops. When the transmittance of excitation light of the optical filters F2–F4 is assumed to be 0.1%, there is the possibility that the intensity of excitation light passing through the clearance becomes about 200 times that of excitation light transmitted through the optical filters and the S/N ratio is reduced to nearly 1/200.

FIG. 4 shows another example of a course of light where an image of an object is formed in an objective optical system unlike that of FIG. 2. FIG. 5 shows another example of a course where excitation light passes through the clearance between the optical filers and the lens frame in FIG. 4. Also, the lens frame and the solid-state image sensor frame are omitted from the figures. In FIG. 4, lenses L5–L7 and optical filters F7–F9 of the objective optical system are incased in the lens frame, not shown.

In FIG. 4, when one of the optical filters is the excitation light cutoff filter, rays refracted in the proximity of the periphery of the image-side curved surface of the lens L5 become nearly parallel with the optical axis and travel in straight lines through the clearance between the outside surfaces of the optical filters F7–F9 and the inside surface of the lens frame, not shown. As such, the above problem is not limited to a particular lens arrangement. That is, this problem arises when the outside diameter of an object-side lens close to the excitation light cutoff filter is larger than that of the excitation light cutoff filter.

As another factor of reducing the contract of fluorescent image, there is the phenomenon that part of fluorescent light transmitted through the excitation light cutoff filter and imaged on the imaging surface of the solid-state image sensor repeats reflection between the imaging surface and the optical filters and is reimaged on the imaging surface, following another course.

In order to obtain the fluorescent image of good contrast, as mentioned above, it is necessary to solve new technical problems in addition to already known techniques.

SUMMARY OF THE INVENTION

In the imaging apparatus for endoscopes according to the present invention includes an objective optical system forming an image of an object and a holding frame retaining the objective optical system. In this case, the objective optical system is provided with optical filters which reduce a transmittance in a particular wavelength region of illumination light irradiating the object to 0.1% or less and has a light passage preventing means of blocking light passing through a clearance between the outside surfaces of the optical filters and the inside surface of the holding frame retaining the optical filters.

In the imaging apparatus for endoscopes according to the present invention includes an objective optical system forming an image of an object and a holding frame retaining the objective optical system. In this case, the objective optical system is provided with optical filters which reduce the transmittance of excitation light inducing fluorescent light of the object to 0.1% or less and has a light passage preventing means of blocking the excitation light passing through a clearance between the outside surfaces of the optical filters and the inside surface of the holding frame retaining the optical filters.

In the imaging apparatus for endoscopes according to the present invention, the outside diameter of an adjacent lens on the object side of the optical filters in the objective optical system is made smaller than those of the optical filters.

In the imaging apparatus for endoscopes according to the present invention, a holding member whose outside diameter is larger than those of the optical filters and whose inside diameter is smaller than the outside diameters of the optical filters is placed close to the optical filters.

According to the present invention, the imaging apparatus for endoscopes can be provided which has a lens arrangement or a mechanical structure, blocking illumination light passing through the clearance between the outside surfaces of the optical filters which reduce the transmittance in a particular wavelength region of the illumination light irradiating the object to 0.1% or less and the inside surface of the holding frame retaining the optical filters and reaching the solid-state image sensor. Further, the imaging apparatus for endoscopes in which optical filters most suitable for lessening the influence of ghost flare are arranged can be provided.

These and other features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, the function and effect of the present invention will be explained.

Like the imaging apparatus for endoscopes of the present invention, when the objective optical system is provided with a light passage preventing means of blocking light passing through a clearance between the outside surfaces of the optical filters and the inside surface of the holding frame retaining the optical filters, light unnecessary for observation can be eliminated.

In the imaging apparatus for endoscopes of the present invention, when the outside diameter of the adjacent lens on the object side of the optical filters in the objective optical system is made smaller than those of the optical filters, a lens arrangement which fails to produce light traveling in straight lines through the clearance between the outside surfaces of the optical filters and the inside surface of the holding frame retaining the optical filters can be realized.

In the imaging apparatus for endoscopes of the present invention, when a holding member whose outside diameter is larger than those of the optical filters and whose inside diameter is smaller than the outside diameters of the optical filters is placed close to the optical filters, a mechanical structure in which light does not enter the clearance between the outside surfaces of the optical filters and the inside surface of the holding frame retaining the optical filters can be realized. Further, when the holding member is placed on the image side of the optical filters, a mechanical structure which blocks light traveling in straight lines through the clearance between the outside surfaces of the optical filters and the inside surface of the holding frame retaining the optical filters can be realized.

Next, the embodiments of the present invention will be described.

Figure 11:
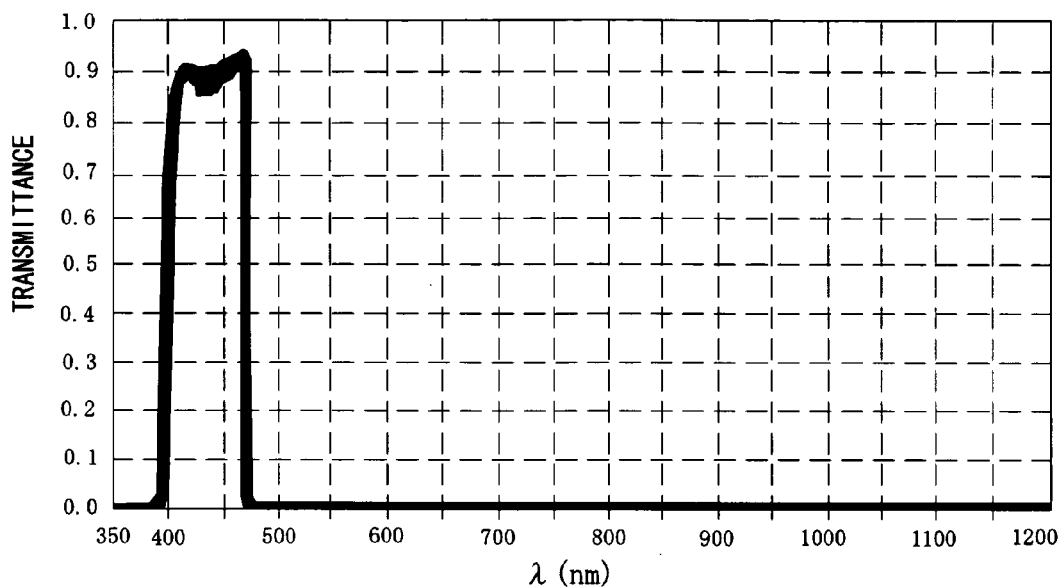
FIG. 11 is a graph showing wavelength characteristics of excitation light emitted from a light source means and irradiating the object from the distal end portion of an endoscope in the imaging apparatus for endoscopes of each of the embodiments.
Figure 12:
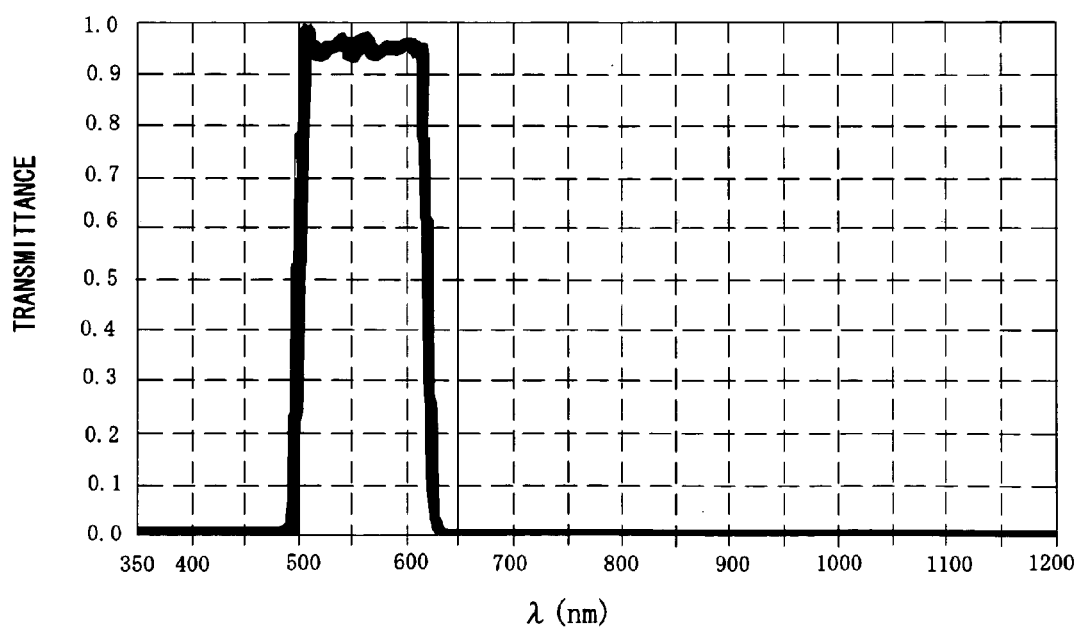
FIG. 12 is a graph showing synthetic characteristics of five kinds of interference films provided in the objective optical system of the imaging apparatus for endoscopes of each embodiment.

FIG. 11 shows wavelength characteristics of excitation light emitted from a light source means and irradiating the object from the distal end portion of the endoscope in the imaging apparatus for endoscopes of each of the embodiments to be described below. As shown in FIG. 11, the imaging apparatus of each embodiment is such that the object is irradiated with excitation light in the wavelength region of 400–470 nm. The objective optical system forming the image of the object is provided with five kinds of interference films shown in FIGS. 13–17, and these interference films, as shown in FIG. 12, have synthetic characteristics that light in only the wavelength region of 500–620 nm is transmitted. Whereby, excitation light of wavelength 500 nm or less is cut off (the transmittance is reduced to 0.1% or less) and at the same time, unwanted fluorescent light produced in the wavelength region of wavelength 620 nm or more and near-infrared light emanating from the living body are reduced, with the result that diagnosis performance is improved.

First Embodiment

Figure 1:
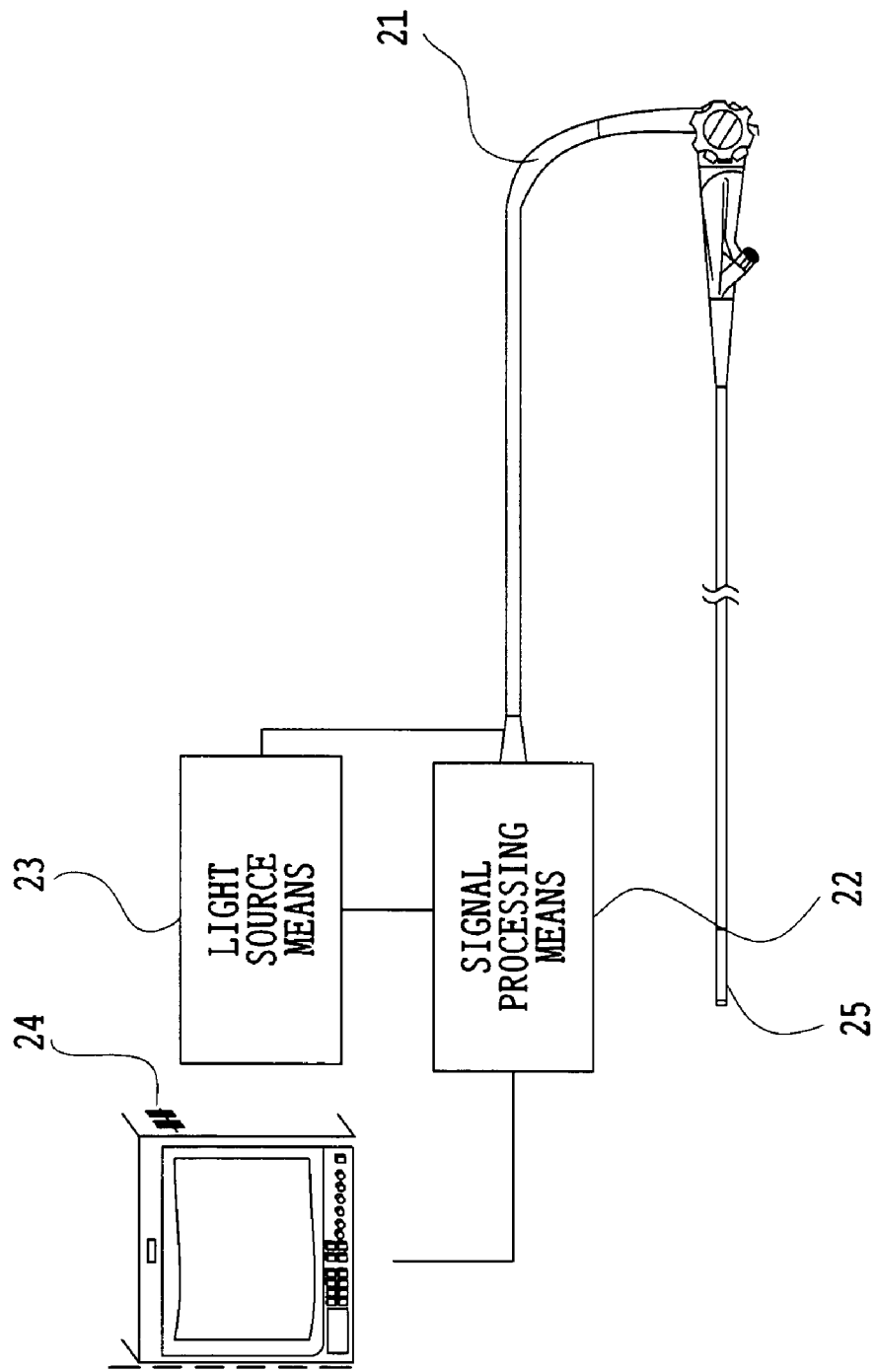
FIG. 1 is an appearance view showing a conventional example of an endoscope system for observing fluorescence.
Figure 2:
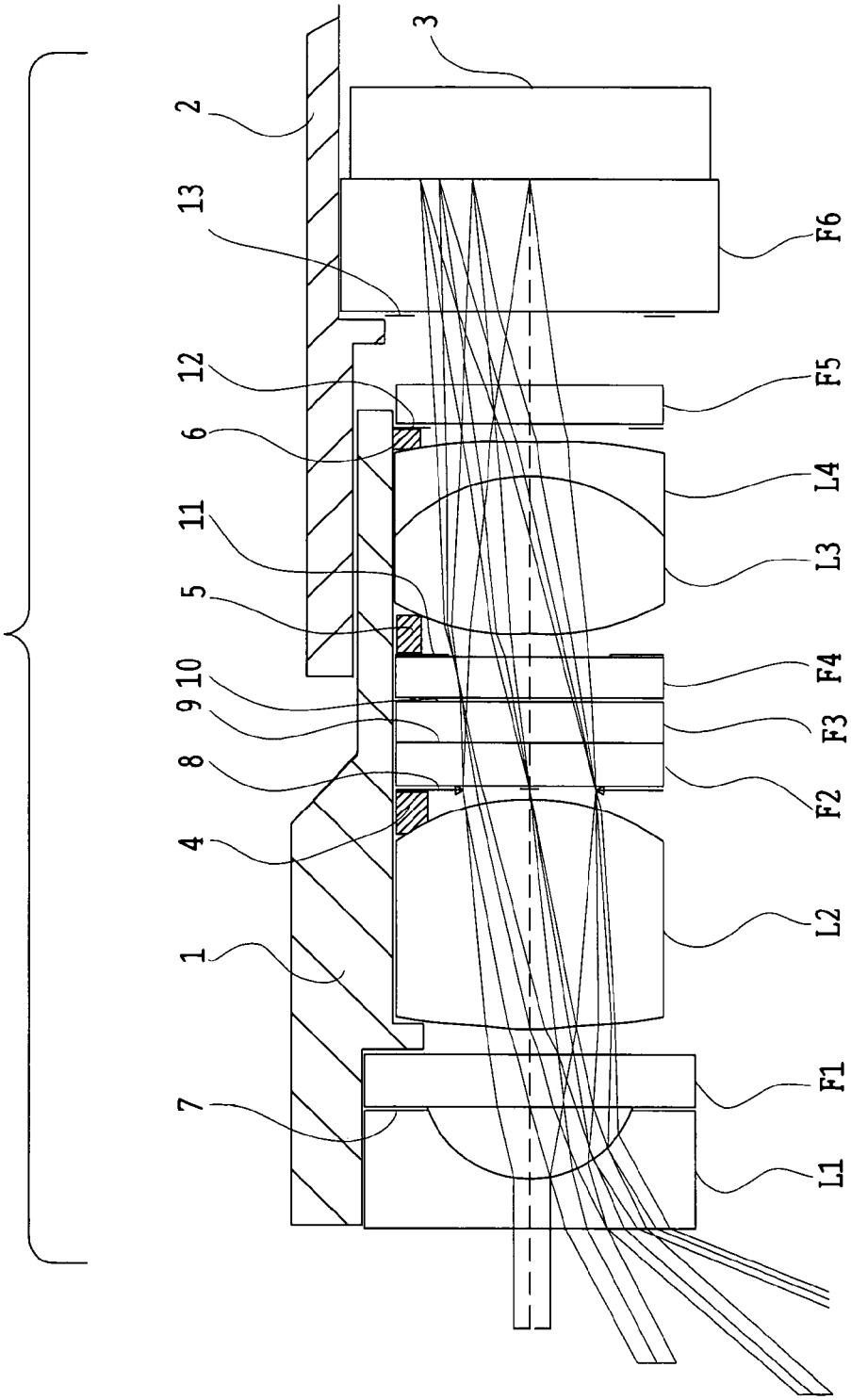
FIG. 2 is a view showing schematically one example of an objective optical system commonly used in an imaging apparatus for endoscopes in which the objective optical system is provided with optical filters which reduce the transmittance of illumination light irradiating an object in a particular wavelength range to 0.1% or less.
Figure 3:
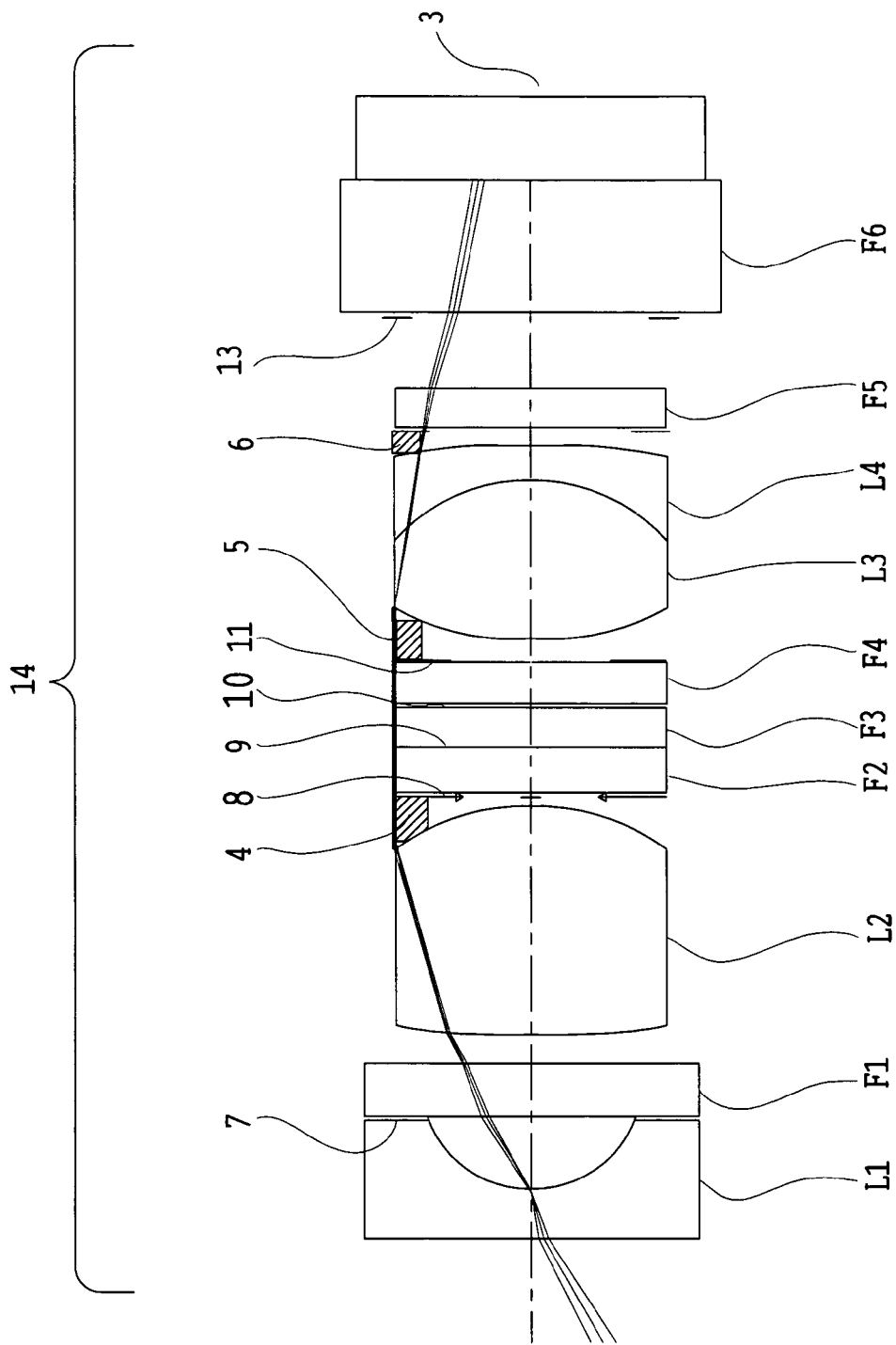
FIG. 3 is an explanatory view showing an example of a course where excitation light passes through a clearance between the optical filters and a lens frame in FIG. 2.
Figure 4:
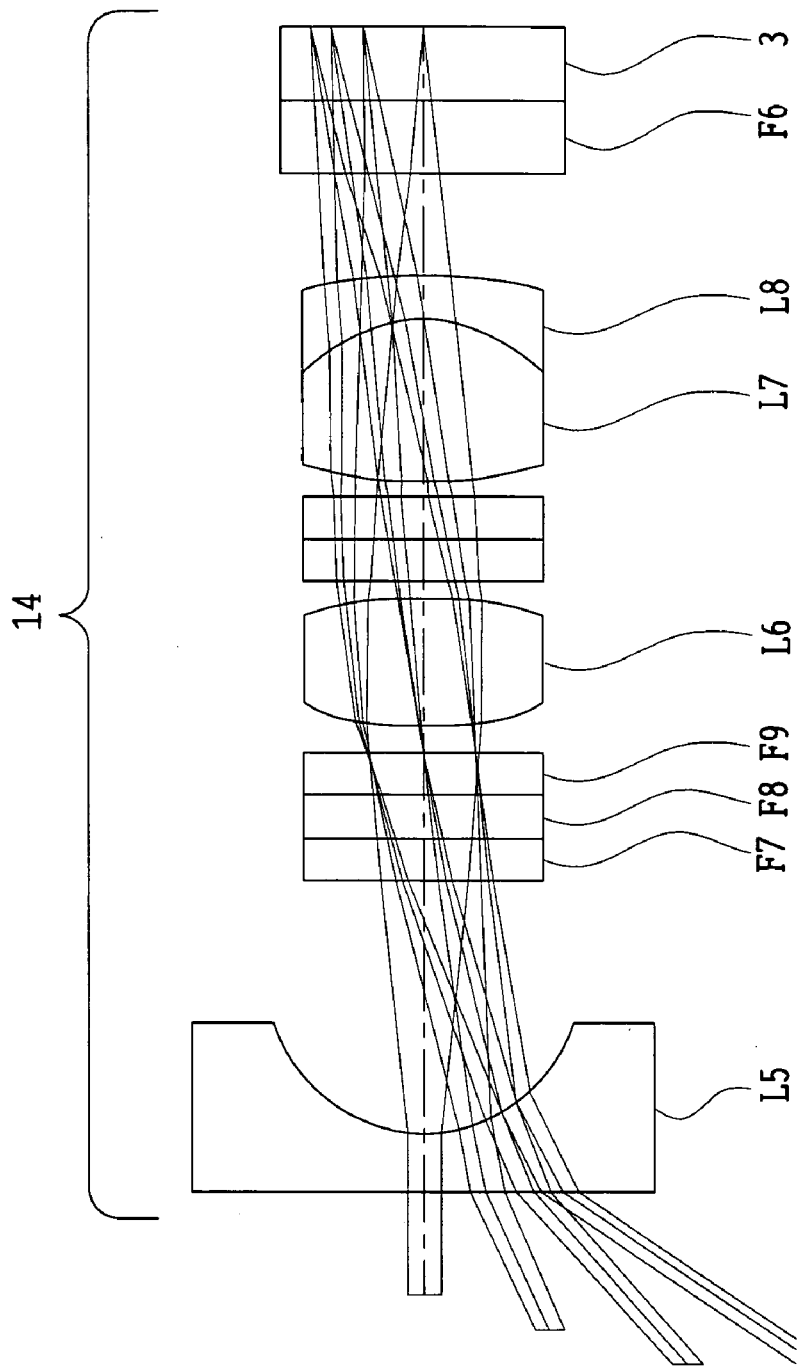
FIG. 4 is an explanatory view showing another example of a course of light where an image of an object is formed in an objective optical system unlike that of FIG. 2.
Figure 5:
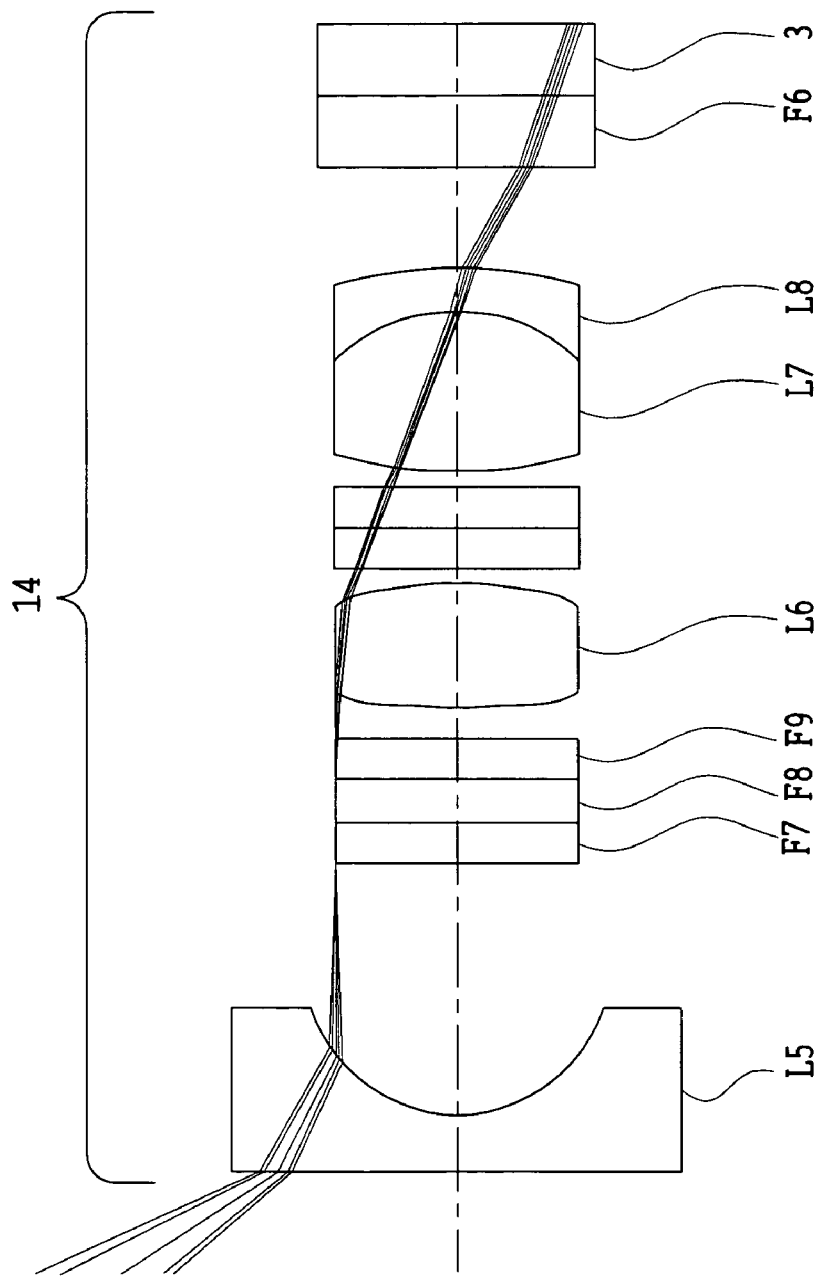
FIG. 5 is an explanatory view showing another example of a course where excitation light passes through a clearance between the optical filters and the lens frame in FIG. 4.
Figure 6:
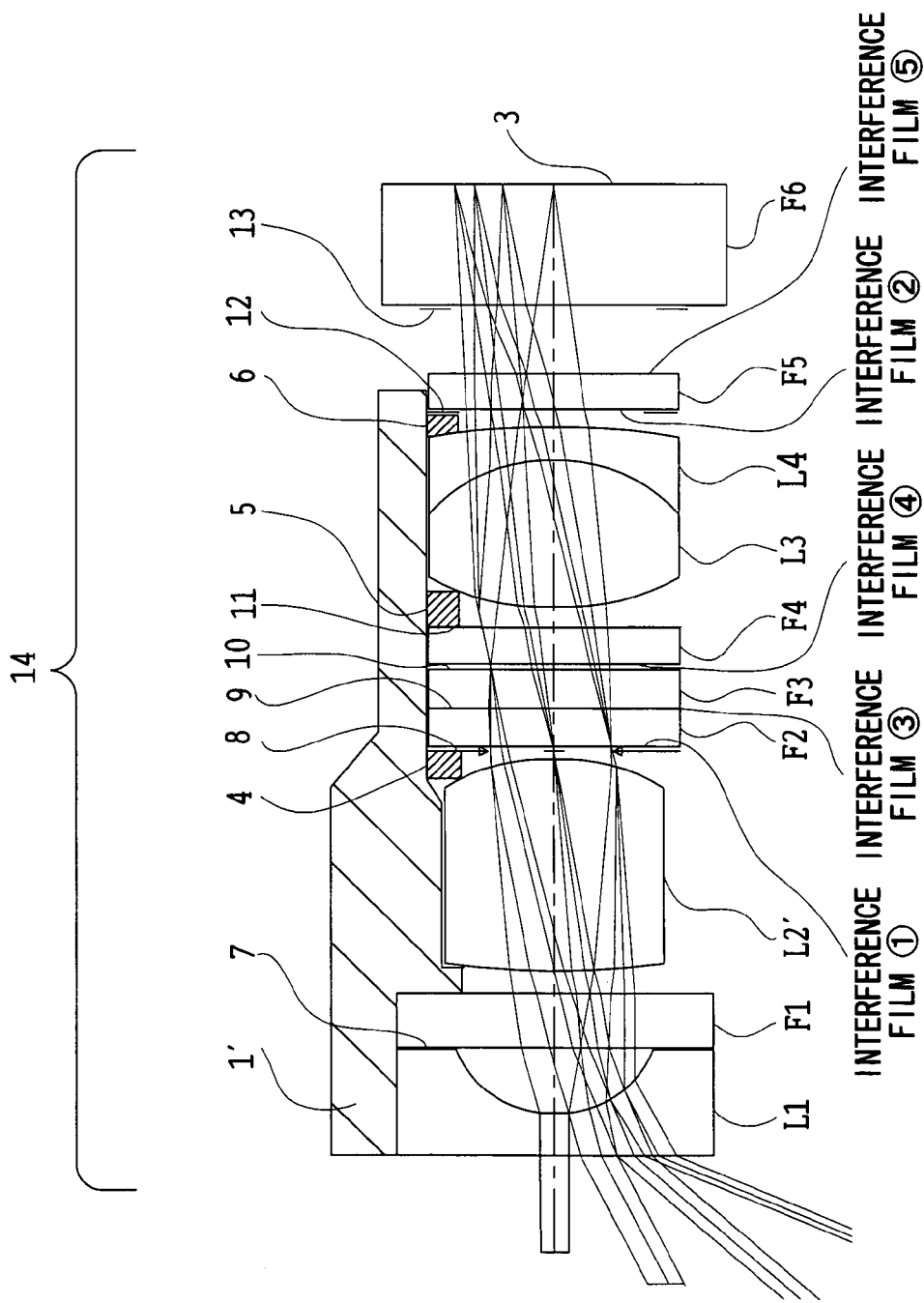
FIG. 6 is a sectional view showing schematically an optical arrangement, developed along the optical axis, of a first embodiment of the imaging apparatus for endoscopes according to the present invention.

FIG. 6 shows an optical arrangement of the first embodiment of the imaging apparatus for endoscopes according to the present invention.

An imaging apparatus 14 for endoscopes in the first embodiment has an objective optical system forming an image of an object and a lens frame 1' constructed as a holding frame retaining the objective optical system. Also, in FIG. 6, again, reference numeral 2 denotes a solid-state image sensor frame, symbol F6 denotes a filter or cover glass, and numeral 3 denotes a solid-state image sensor. Reference numeral 13 denotes a stop.

The objective optical system includes, in order from the object side, the plano-concave lens L1 whose object-side surface is flat and whose image-side surface is concave, the stop 7, the filter F1, a biconvex lens L2', the stop 8, the filter F2, the stop 9, the filter F3, the stop 10, the filter F4, the stop 11, a cemented doublet of the biconvex lens L3 and the negative meniscus lens L4 with a concave surface facing the object side, the stop 12, and the filter L5. The spacer ring 4 is interposed between the biconvex lens L2' and the filter F2, the spacer ring 5 is interposed between the filter F4 and the biconvex lens L3, and the spacer ring 6 is interposed between the negative meniscus lens L4 with a concave surface facing the object side and the filter F5.

Figure 13:
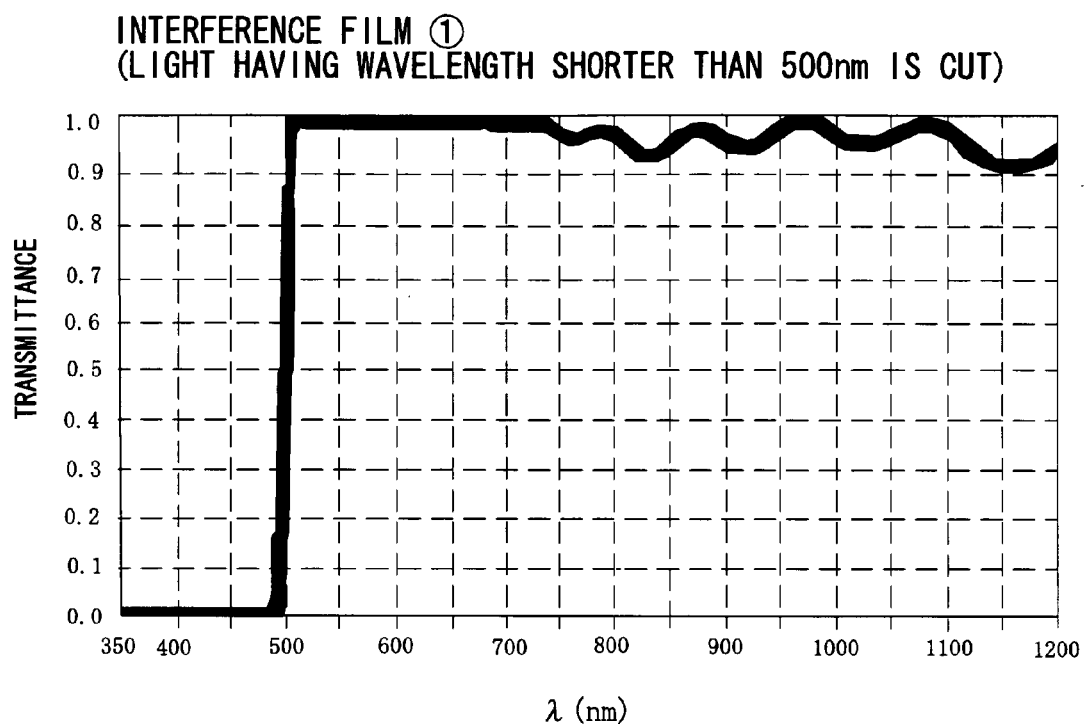
FIG. 13 is a graph showing characteristics of one interference film provided in the objective optical system of the imaging apparatus for endoscopes of each embodiment.

The object-side surface of the optical filter F2 is provided with the interference film which has excitation light cut-off characteristics shown in FIG. 13.

Black painting for absorbing light and preventing reflection of light is applied to the inside and outside surfaces of the spacer rings 4–6 and of the stops 7–12 and the inside surface of the lens frame 1'.

The biconvex lens L2' has an outside diameter of 1.7 mm and is configured smaller than an outside diameter of 2 mm of the spacer rings 4 and 5, the optical filters F2–F5, and the stops 8–11.

In the imaging apparatus 14 for endoscopes of the first embodiment constructed as mentioned above, rays of light refracted in the proximity of the periphery of the image-side curved surface of the lens L2' and rendered nearly parallel with the optical axis of the objective optical system are produced in only the region of an outside diameter of 1.7 mm which is the same as the outside diameter of the biconvex lens L2'. Thus, there is no ray traveling in a straight line, parallel with the optical axis, through a clearance produced by a difference between the outside diameter of 2 mm of the optical filter F2 having excitation light cutoff characteristics and the inside diameter of the lens frame 1'. Also, since each of rays of light refracted by the bi-convex lens L1' and entering the clearance between the outside surface of the spacer ring 4 and the inside surface of the lens frame 1' is not parallel with the optical axis, it repeats reflection and absorption in the clearance between the outside surface of the spacer ring 4 and the inside surface of the lens frame 1'. Consequently, the amount of light is materially reduced and the ray fails to reach the solid-state image sensor 3.

In the first embodiment, as mentioned above, the outside diameter of the biconvex lens L2' located on the object side of the optical filter F2 is rendered smaller than that of the optical filter F2 having the excitation light cutoff characteristics, and a means of avoiding the production of excitation light traveling in straight lines through the clearance between the outside surface of the optical filter F2 and the inside surface of the lens frame 1' is realized by the lens arrangement. As a result, of all light from the object, only light of particular wavelengths incident on the interference film having excitation light cutoff characteristics, deposited on the object-side surface of the optical filter F2, passes through the interference film, and thus excitation light components unnecessary for observation can be eliminated.

Also, it is desirable that a difference in outside diameter between the optical filter F2 and the biconvex lens L2' is at least 0.1 mm. When the difference of the outside diameter is set to at least 0.1 mm, it becomes possible to avoid the production of the rays traveling in straight lines, parallel with the optical axis, through the clearance produced by the difference between the outside diameter of 2 mm of the optical filter F2 and the inside diameter of the lens frame 1', even though manufacturing errors are caused to the outside diameters of the optical filter F2 and the biconvex lens L2' and the inside diameter of the lens frame 1', or variations of positions of the optical filter F2 and the biconvex lens L2' are caused inside the lens frame 1'.

Figure 14:
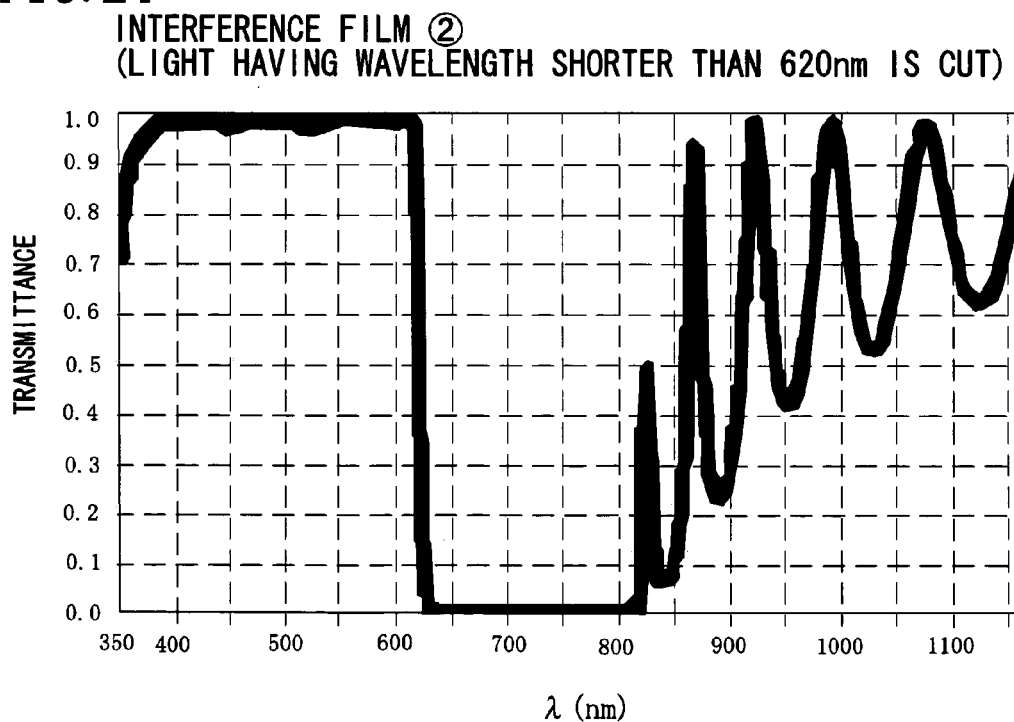
FIG. 14 is a graph showing characteristics of another interference film provided in the objective optical system of the imaging apparatus for endoscopes of each embodiment.
Figure 15:
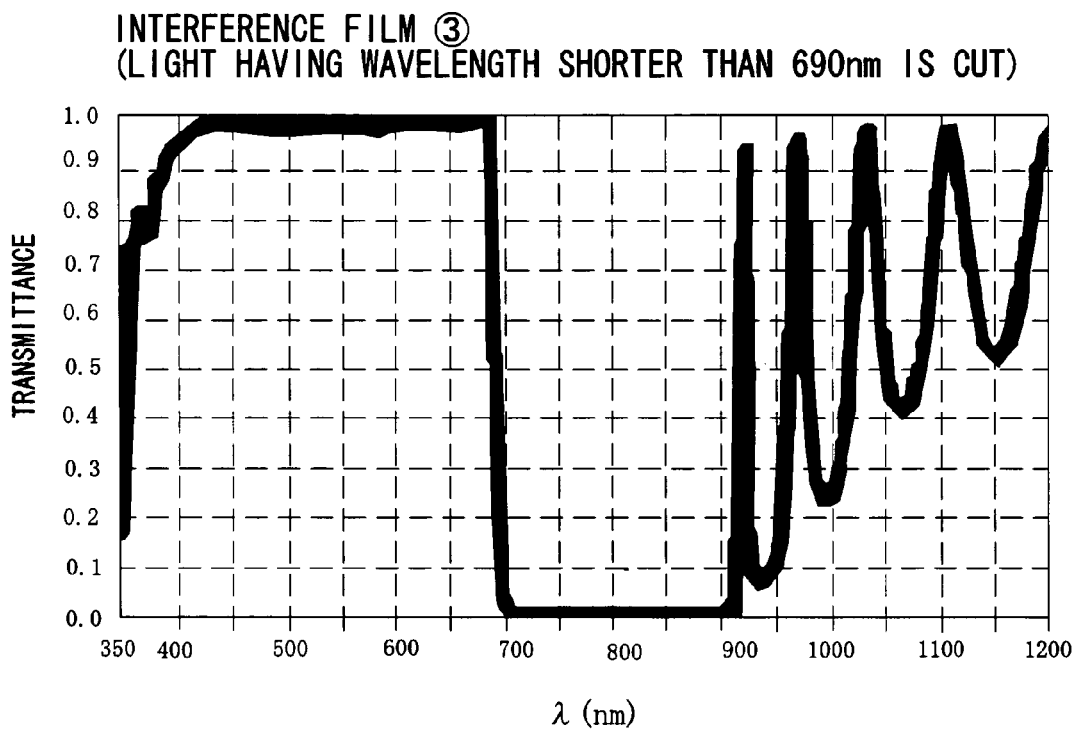
FIG. 15 is a graph showing characteristics of still another interference film provided in the objective optical system of the imaging apparatus for endoscopes of each embodiment.
Figure 16:
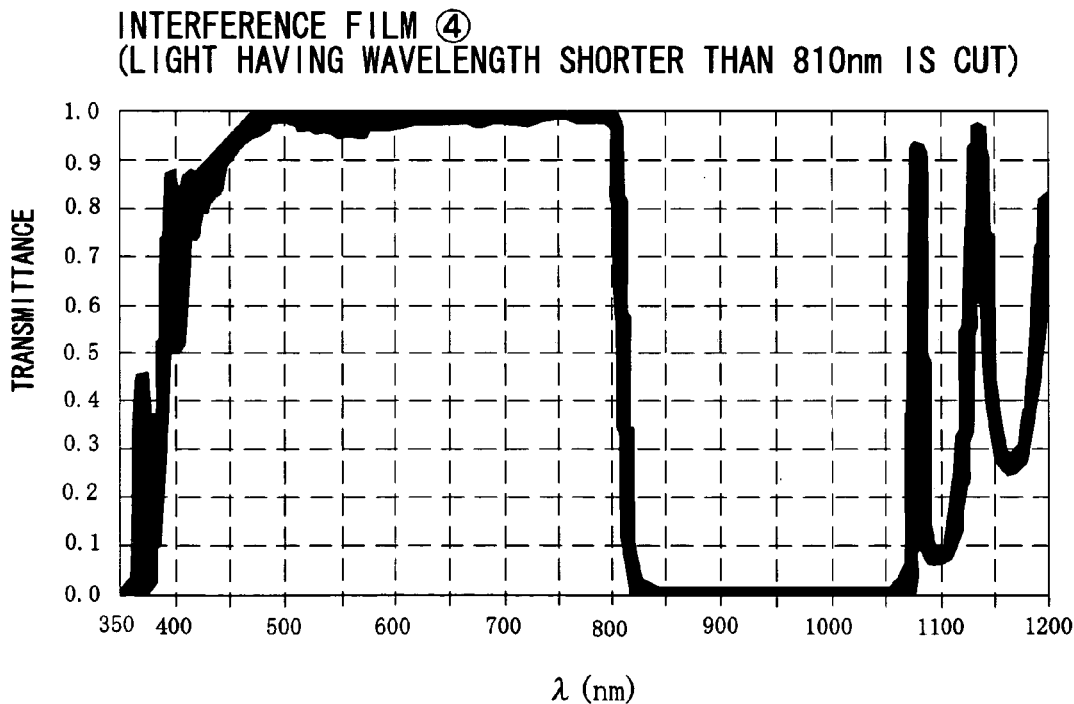
FIG. 16 is a graph showing characteristics of still another interference film provided in the objective optical system of the imaging apparatus for endoscopes of each embodiment.
Figure 17:
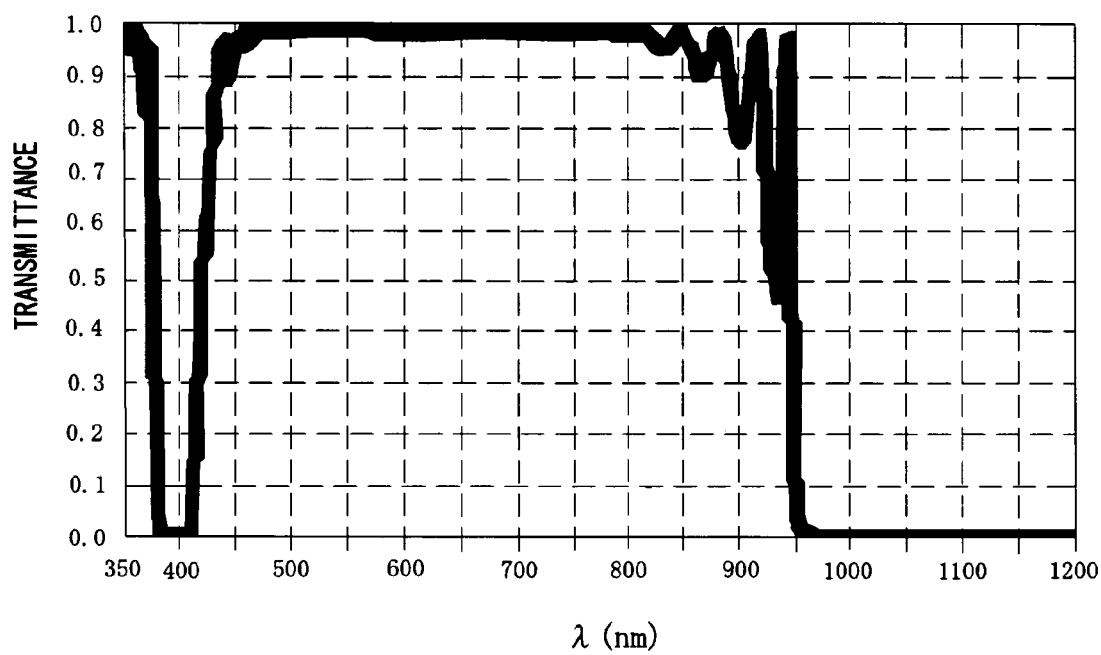
FIG. 17 is a graph showing characteristics of still another interference film provided in the objective optical system of the imaging apparatus for endoscopes of each embodiment.

In the first embodiment, an interference film having characteristics shown in FIG. 15 is provided on the object-side surface of the optical filter F3, an interference film having characteristics shown in FIG. 16 is provided on the object-side surface of the optical filter F4, an interference film having characteristics shown in FIG. 14 is provided on the object-side surface of the optical filter F5, and an interference film having characteristics shown in FIG. 17 is provided on the image-side surface of the optical filter F5.

Figure 18:
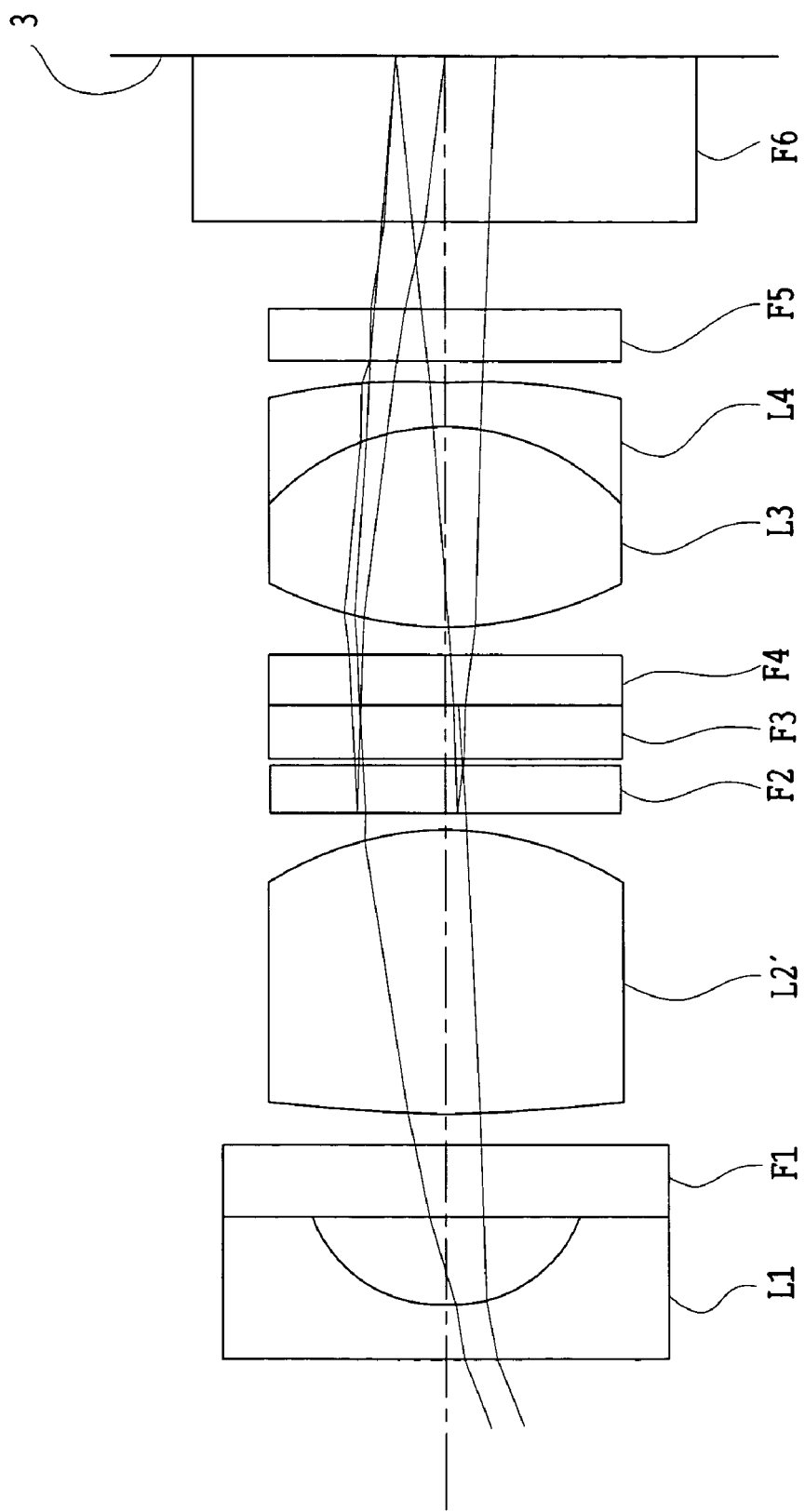
FIG. 18 is an explanatory view showing rays of light where fluorescent light from the object, after being imaged on the surface of the solid-image sensor, are reflected by the solid-state image sensor, are further reflected by the interference film of an optical filter, and reach again the solid-state image sensor in the first embodiment of the imaging apparatus for endoscopes.

FIG. 18 shows rays of light where fluorescent light from the object, after being imaged on the surface of the solid-image sensor 3, are reflected by the solid-state image sensor 3, are further reflected by the interference film of the optical filter F2, and reach again the solid-state image sensor 3. Even in the interference films of the optical filters F3 and F4, rays similar to those of FIG. 18 are produced.

Figure 19:
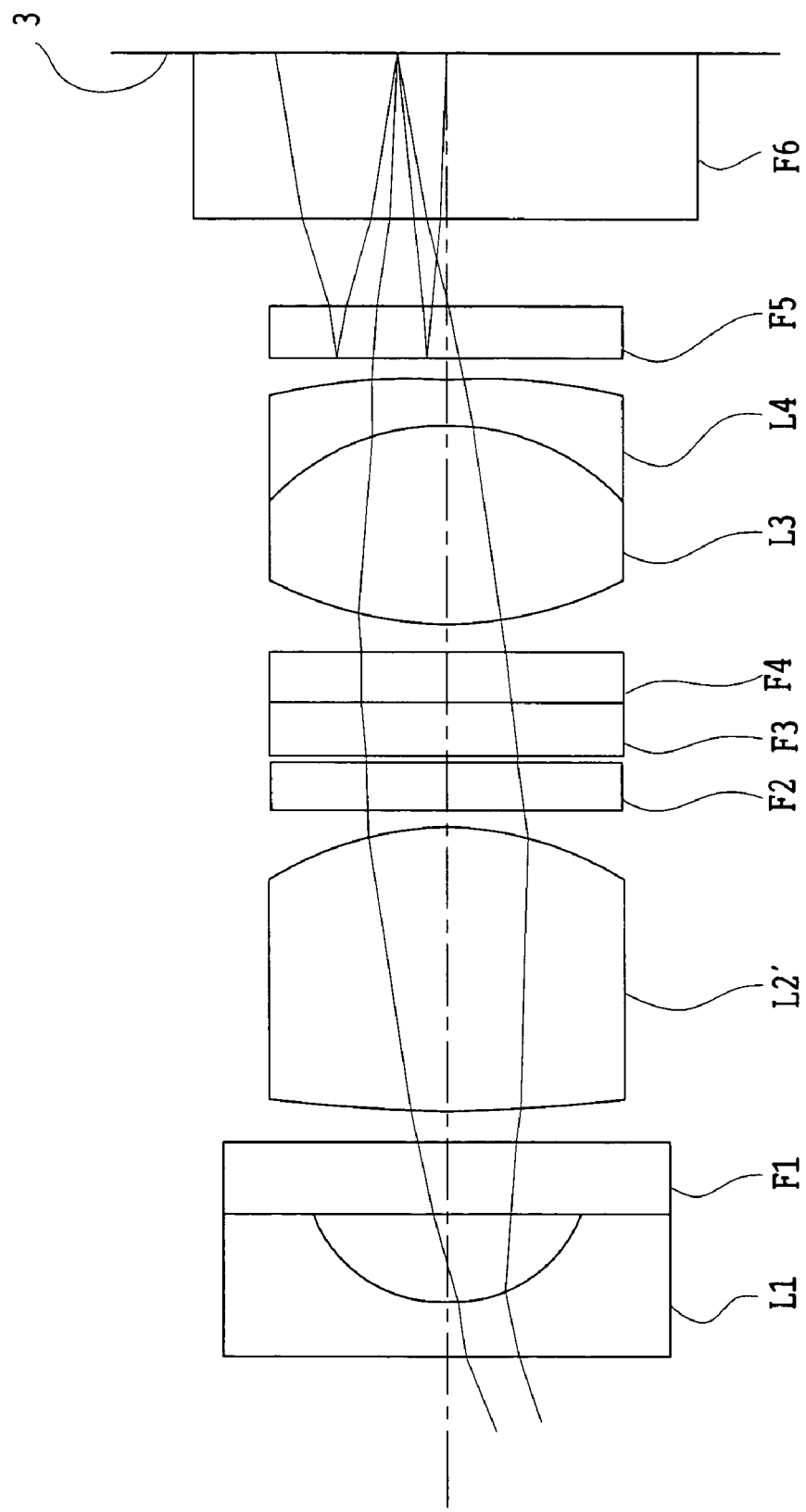
FIG. 19 is an explanatory view showing rays of light where fluorescent light from the object, after being imaged on the surface of the solid-image sensor, are reflected by the solid-state image sensor, are further reflected by the object-side interference film of another optical filter, and reach again the solid-state image sensor in the first embodiment of the imaging apparatus for endoscopes.

FIG. 19 shows rays of light where fluorescent light from the object, after being imaged on the surface of the solid-image sensor 3, are reflected by the solid-state image sensor 3, are further reflected by the object-side interference film of the optical filter F5, and reach again the solid-state image sensor 3. Even in the image-side interference film of the optical filter F5, rays similar to those of FIG. 19 are produced. Such a ray, called ghost flare, causes a reduction of the contrast of the image. Since the interference film and the surface of the solid-state image sensor 3 are high in reflectance, there is the need to lower the intensity of light of the ghost flare. The first embodiment is constructed so that the interference films having characteristics shown in FIGS. 13–17 are distributed before and behind the lenses L3 and L4, and hence, as shown in FIGS. 18 and 19, the position of the ghost flare on the surface of the solid-state image sensor 3 can be shifted. Whereby, the intensity of light of the ghost flare can be reduced.

In the first embodiment, the interference film having excitation light cutoff characteristics shown in FIG. 13 is located on the object side of the interference films having characteristics shown in FIGS. 14–17. According to the imaging apparatus for endoscopes of the first embodiment, therefore, it becomes possible that autofluorescence from the interference films of FIGS. 14–17, due to excitation light, is not produced. This improves observation performance.

Since the lens frame 1' retaining the objective optical system is integrally constructed, the deterioration of imaging performance attributable to the decentration of the lenses L1–L4 can be lessened.

Subsequently, numerical data of optical members constituting the imaging apparatus 14 for endoscopes of the first embodiment are shown below.

Numerical Data 1

Stop surfaces: third, eighth, tenth, twelfth, fifteenth, nineteenth, and twenty-second surfaces Object distance=10.4000, Image height=0.803, Focal length=0.847, Fno=2.686, Object-side NA=−0.0143, Image-side NA=0.1862, Overall length (first surface to last surface)=7.877

| Surface number | Radius of curvature | Surface (or air) spacing | Refractive index | Abbe's number |
|---|---|---|---|---|
| 1 | ∞ | 0.3600 | 1.88300 | 40.78 |
| 2 | 0.8000 | 0.5200 | | |
| 3 | ∞ | 0.0300 | | |
| 4 | ∞ | 0.4000 | 1.52300 | 59.80 |
| 5 | ∞ | 0.2000 | | |
| 6 | 6.3219 | 1.7181 | 1.71300 | 53.84 |
| 7 | −1.8032 | 0.0700 | | |
| 8 | ∞ | 0.0300 | | |
| 9 | ∞ | 0.3000 | 1.52300 | 59.89 |
| 10 | ∞ | 0.0300 | | |
| 11 | ∞ | 0.3000 | 1.52300 | 59.80 |
| 12 | ∞ | 0.0300 | | |
| 13 | ∞ | 0.3000 | 1.52300 | 59.89 |
| 14 | ∞ | 0.0300 | | |
| 15 | ∞ | 0.1500 | | |
| 16 | 2.1798 | 1.2000 | 1.69680 | 55.53 |
| 17 | −1.3000 | 0.2600 | 1.84666 | 23.78 |
| 18 | −6.6799 | 0.1000 | | |
| 19 | ∞ | 0.0300 | | |
| 20 | ∞ | 0.3000 | 1.52300 | 59.89 |
| 21 | ∞ | 0.5090 | | |
| 22 | ∞ | 0.0300 | | |
| 23 | ∞ | 0.9800 | 1.53172 | 48.91 |
| 24 | ∞ | | | |

Second Embodiment

Figure 7:
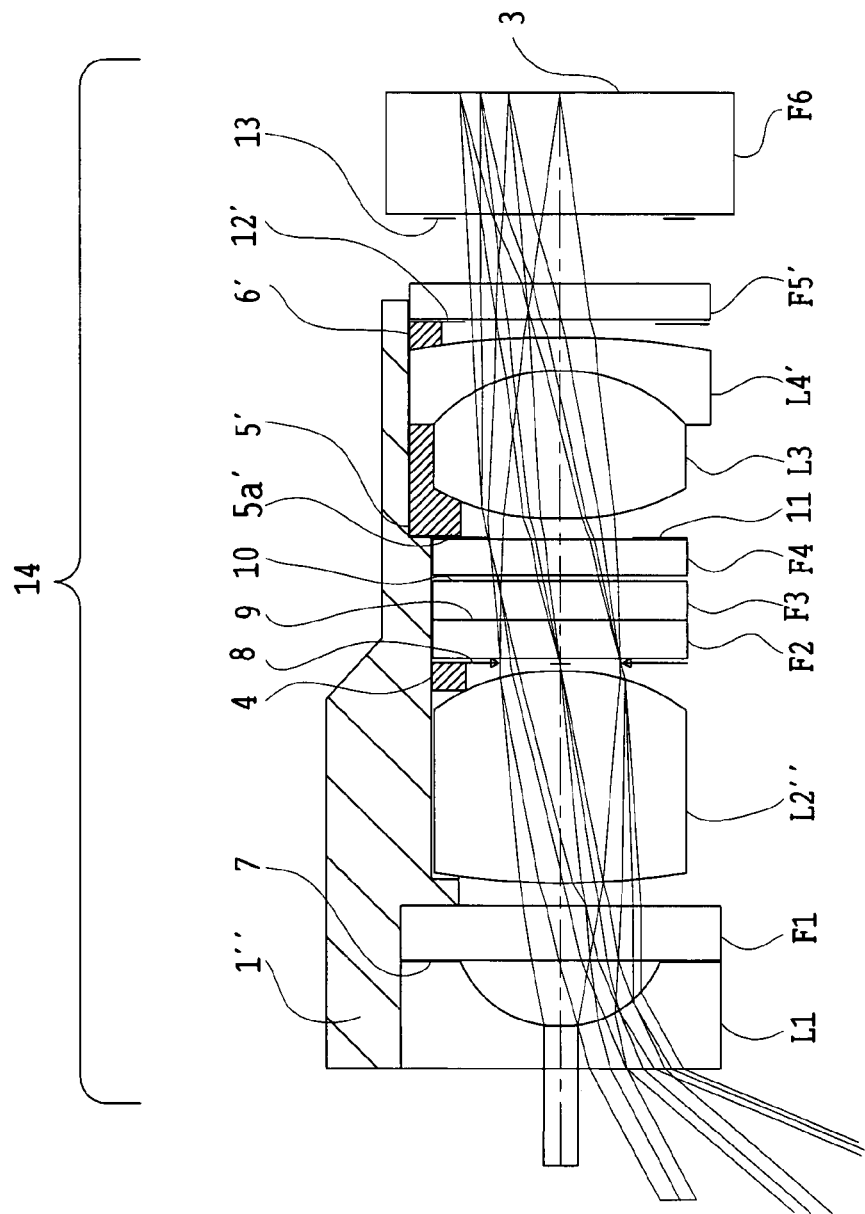
FIG. 7 is a sectional view showing schematically an optical arrangement, developed along the optical axis, of a second embodiment of the imaging apparatus for endoscopes according to the present invention.

FIG. 7 shows an optical arrangement of the second embodiment of the imaging apparatus for endoscopes according to the present invention.

The imaging apparatus 14 for endoscopes of the second embodiment, in contrast with the imaging apparatus for endoscopes of the first embodiment, is such that the outside diameter of a biconvex lens L2" is changed to 2 mm and the outside diameters of a lens L4', an optical filter F5', spacer rings 5' and 6', and a stop 12' are changed to 2.4 mm. In addition, the spacer ring 5' has a projection 5'a with an inside diameter of 1.8 mm. In accordance with these changes, the inside diameter of a lens frame 1" is changed. Thus, in the second embodiment, the outside diameters of the optical filter F2 having excitation light cutoff characteristics and the biconvex lens L2" located on the object side of the optical filter F2 are both set to 2 mm.

In the imaging apparatus 14 for endoscopes of the second embodiment constructed as mentioned above, excitation light refracted in the proximity of the periphery of the image-side curved surface of the biconvex lens L2" becomes parallel with the optical axis and travels in straight lines through a clearance between the outside surfaces of the spacer ring 4, the optical filters F2–F4, and the stops 8–11 and the inside surface of the lens frame 1". However, since the projection 5'a of the spacer ring 5' is configured with an outside diameter of 2.4 mm and an insides diameter of 1.8 mm, the side of the projection 5'a reflects or absorbs the excitation light traveling in straight lines through the clearance corresponding to 2 mm and blocks the light.

The second embodiment, as mentioned above, is provided with the spacer ring 5' whose outside diameter is larger than that of the optical filter F2 having the excitation light cutoff characteristics and whose inside diameter is smaller than the outside diameter of the optical filter F2, and uses a means of blocking the excitation light traveling in straight lines through the clearance between the outside surface of the optical filter F2 and the inside surface of the lens frame 1" by constructing the spacer ring as the holding member. As a result, of all light from the object, only light of particular wavelengths incident on the interference film having excitation light cutoff characteristics, provided on the object-side surface of the optical filter F2 passes through the interference film, and thus excitation light components unnecessary for observation can be eliminated.

Also, it is desirable that the difference of the outside diameter between the optical filter F2 and the spacer ring 5' is at least 0.1 mm and the difference between the outside diameter of the optical filter F2 and the inside diameter of the spacer ring 5' is at least 0.1 mm. When the dimensions are set as mentioned above, it becomes possible to block the excitation light traveling in straight lines through the clearance between the outside surface of the optical filter F2 and the inside surface of the lens frame 1", even though manufacturing errors are caused to the optical filter F2 and the spacer ring 5', or variations of positions of the optical filter F2 and the spacer ring 5' are caused inside the lens frame 1".

Third Embodiment

Figure 8:
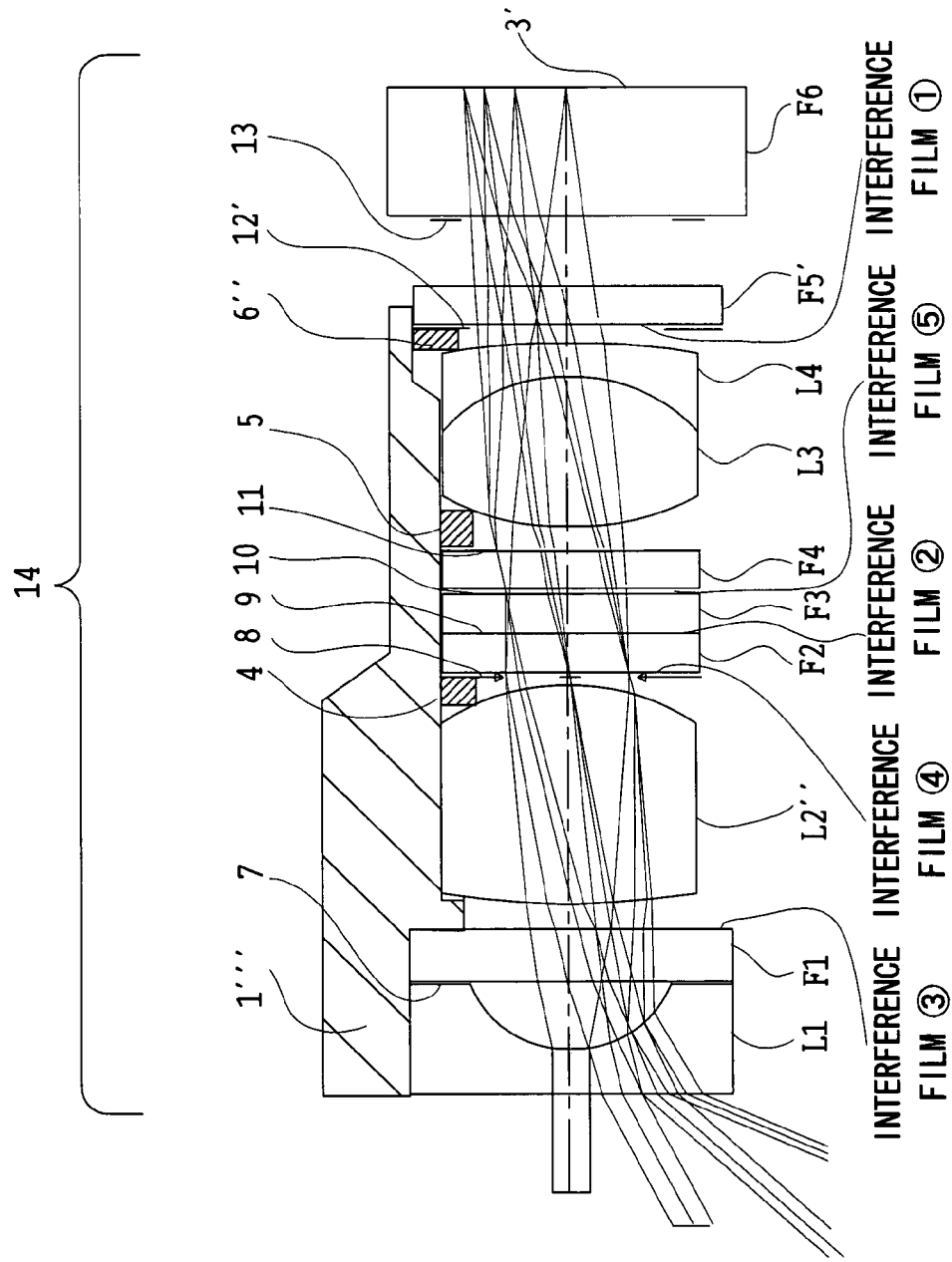
FIG. 8 is a sectional view showing schematically an optical arrangement, developed along the optical axis, of a third embodiment of the imaging apparatus for endoscopes according to the present invention.

FIG. 8 shows an optical arrangement of the third embodiment of the imaging apparatus for endoscopes according to the present invention.

In the imaging apparatus 14 for endoscopes of the third embodiment, the interference film having excitation light cut off characteristics shown in FIG. 13 is provided on the object-side surface of the optical filter 5'.

The imaging apparatus 14 for endoscopes of the third embodiment, in contrast with the imaging apparatus for endoscopes of the first embodiment, is such that the outside diameter of the biconvex lens L2" is changed to 2 mm and the outside diameters of the optical filter F5', a spacer ring 6", and the stop 12' are changed to 2.4 mm. In accordance with these changes, the inside diameter of a lens frame 1''' is changed.

In the imaging apparatus 14 for endoscopes of the third embodiment constructed as mentioned above, rays of light refracted in the proximity of the periphery of the image-side curved surface of the lens L4 and rendered nearly parallel with the optical axis of the objective optical system are produced in only the region of an outside diameter of 2 mm which is the same as the outside diameter of the lens L4. Thus, there is no ray traveling in a straight line, parallel with the optical axis, through a clearance produced by a difference between the outside diameter of 2.4 mm of the optical filter F5' having excitation light cutoff characteristics and the inside diameter of the lens frame 1'''. Also, since each of rays of light refracted by the lens L4 and entering the clearance between the outside surface of the spacer ring 6" and the inside surface of the lens frame 1''' is not parallel with the optical axis, it repeats reflection and absorption in the clearance between the outside surface of the spacer ring 6" to which black painting is applied and the inside surface of the lens frame 1'''. Consequently, the amount of light is materially reduced and the ray fails to reach the solid-state image sensor 3.

In the third embodiment, as mentioned above, the outside diameter of the lens L4 located on the object side of the optical filter F5' is rendered smaller than that of the optical filter F5' having excitation light cutoff characteristics, and thereby a means of avoiding the production of excitation light traveling in straight lines through the clearance between the outside surface of the optical filter F5' and the inside surface of the lens frame 1''' is realized by the lens arrangement. As a result, of all light from the object, only light of particular wavelengths incident on the interference film having excitation light cutoff characteristics, provided on the object-side surface of the optical filter F5', passes through the interference film, and thus excitation light components unnecessary for observation can be eliminated.

Also, it is desirable that a difference in outside diameter between the optical filter F5' and the lens L4 is at least 0.1 mm. When the difference of the outside diameter is set to at least 0.1 mm, it becomes possible to block the excitation light traveling in straight lines through the clearance between the outside surface of the optical filter F5' and the inside surface of the lens frame 1''', even though manufacturing errors are caused to the optical filter F5' and the lens L4, or variations of positions of the optical filter F5' and the lens L4 are caused inside the lens frame 1

In the third embodiment, the interference film having characteristics shown in FIG. 15 is provided on the image-side surface of the optical filter F1, the interference film having characteristics shown in FIG. 16 is provided on the object-side surface of the optical filter F2, the interference film having characteristics shown in FIG. 14 is provided on the object-side surface of the optical filter F3, and the interference film having characteristics shown in FIG. 17 is provided on the object-side surface of the optical filter F4.

Figure 20:
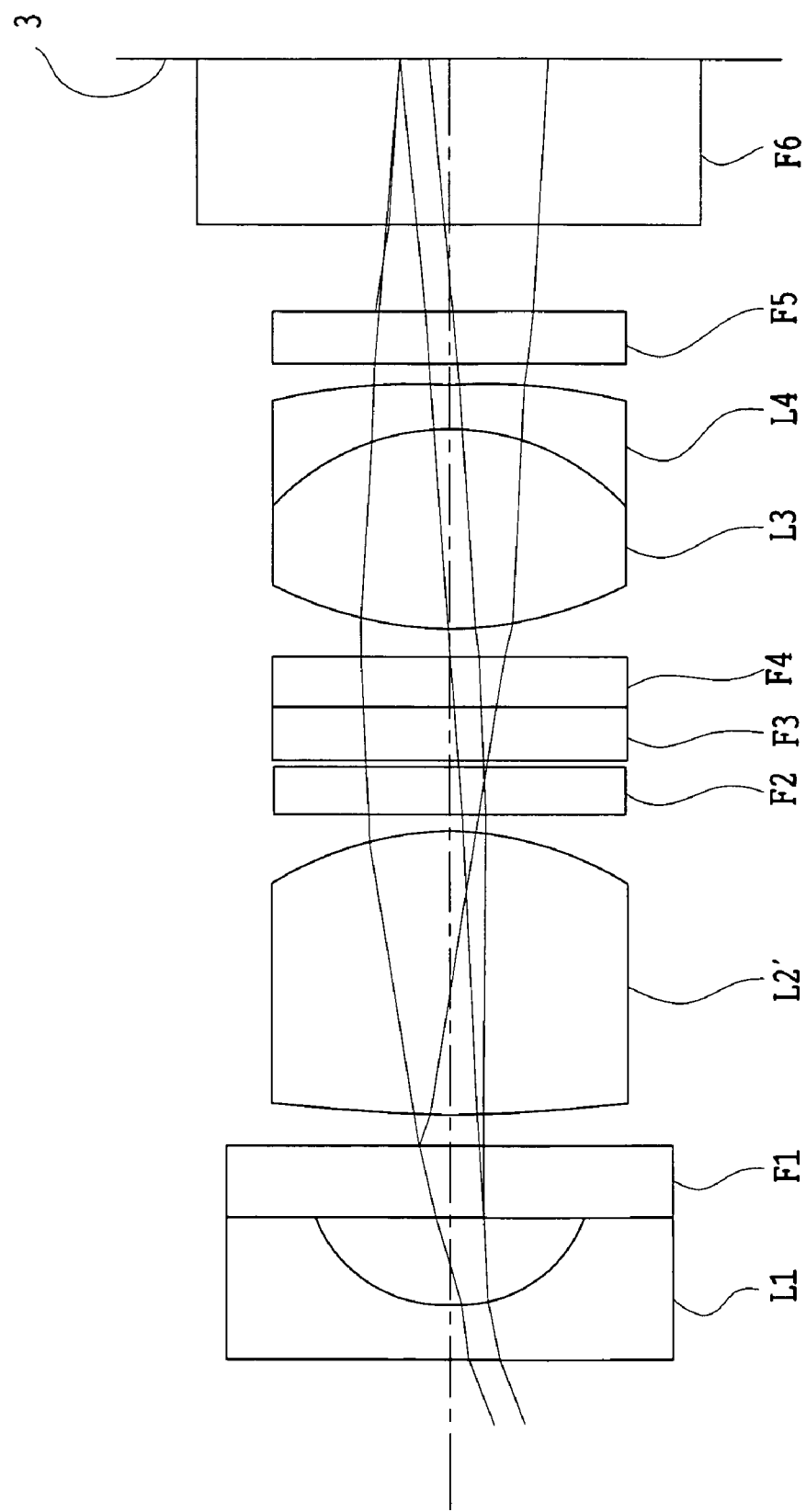
FIG. 20 is an explanatory view showing rays of light where fluorescent light from the object, after being imaged on the surface of the solid-image sensor, are reflected by the solid-state image sensor, are further reflected by the interference film of another optical filter, and reach again the solid-state image sensor in the first embodiment of the imaging apparatus for endoscopes.

FIG. 20 shows rays of light where fluorescent light from the object, after being imaged on the surface of the solid-image sensor, are reflected by the solid-state image sensor, are further reflected by the interference film of the optical filter F1, and reach again the solid-state image sensor. As shown in FIG. 20, it is found that the position of ghost flare produced in the optical filter F1 is shifted form the positions of ghost flare produced in the optical filters F2–F5 shown in FIGS. 18 and 19. However, in the imaging apparatus for endoscopes of the third embodiment, since the optical filter F1 is provided with the interference film, the position of ghost flare can be shifted, as compared with the imaging apparatus for endoscopes of the first embodiment, and the intensity of light of the ghost flare can be further reduced.

In the third embodiment, of the optical filters F1–F5', the optical filter F5' which has the smallest incident angle of an imaging ray is provided with the interference film having excitation light cutoff characteristics. Consequently, it becomes possible that the fluctuations of the excitation light cutoff characteristics involved in the incident angle of the ray are kept to a minimum. It is also possible that characteristics cutting off wavelengths less than 500 nm, shown in FIG. 13, are set to the shorter wavelength side, for example, characteristics cutting off wavelengths less than 490 nm are set, to increase the amount of fluorescent light.

Fourth Embodiment

Figure 9:
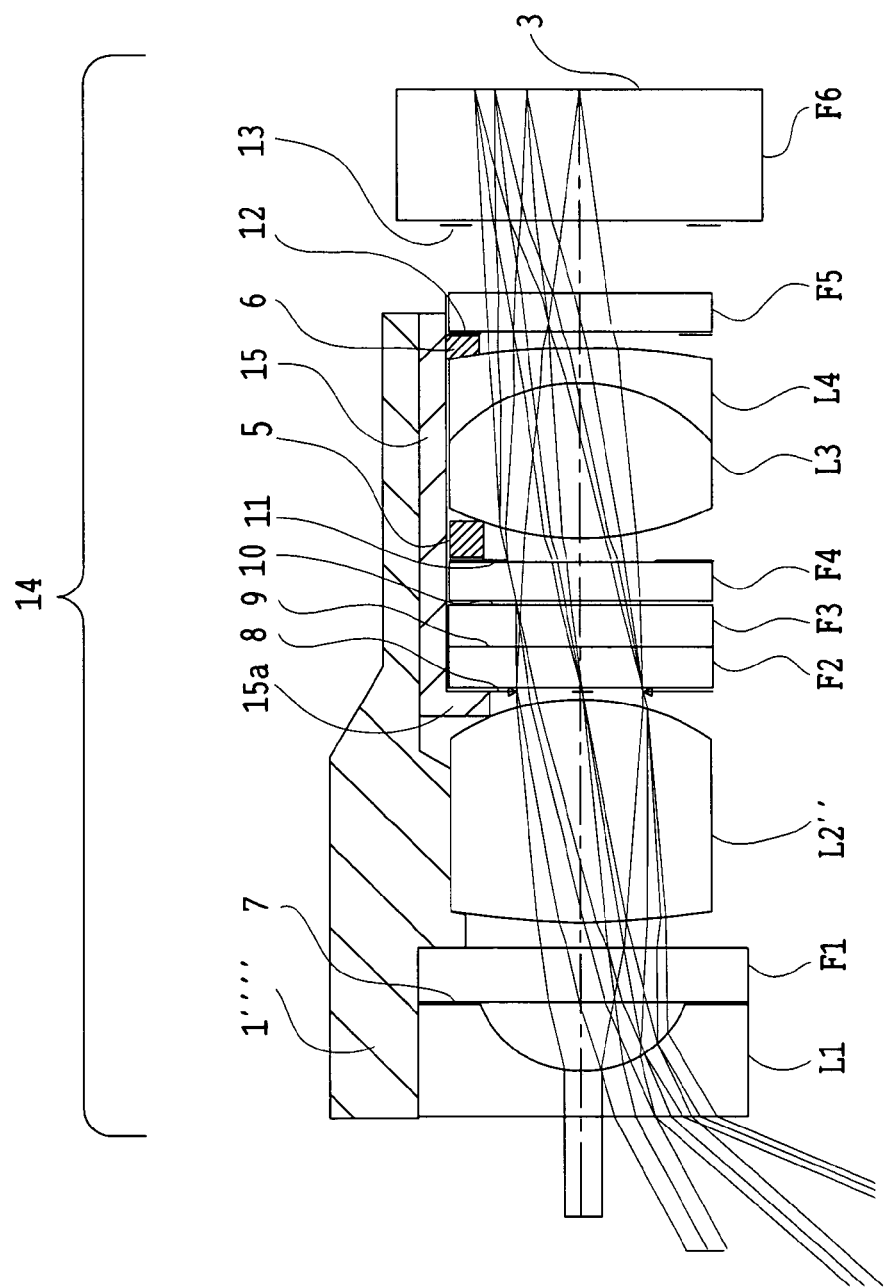
FIG. 9 is a sectional view showing schematically an optical arrangement, developed along the optical axis, of a fourth embodiment of the imaging apparatus for endoscopes according to the present invention.

FIG. 9 shows an optical arrangement of the fourth embodiment of the imaging apparatus for endoscopes according to the present invention.

The imaging apparatus 14 for endoscopes of the fourth embodiment, in contrast with the imaging apparatus for endoscopes of the first embodiment, is such that the outside diameter of the biconvex lens L2" is changed to 2 mm and the holding frame is divided into two pieces, a lens frame 1"" and a lens frame 15. The lens frame 15 is set to 2.4 mm in outside diameter and has a projection 15a set to 1.8 mm in inside diameter.

In the imaging apparatus for endoscopes of the fourth embodiment constructed as mentioned above, rays of light refracted in the proximity of the periphery of the image-side curved surface of the biconvex lens L2" and rendered nearly parallel with the optical axis of the objective optical system are produced in only the region of an outside diameter of 2 mm which is the same as the outside diameter of the biconvex lens L2". However, since the light is blocked by the side of the projection 15a of the lens frame 15, there is no ray traveling in a straight line, parallel with the optical axis, through a clearance produced by a difference between the outside diameter of 2 mm of the optical filter F2 having excitation light cutoff characteristics and the inside diameter of the lens frame 15. Also, since each of rays of light refracted by the biconvex lens L2" and entering the clearance between the outside surface of the lens frame 15 and the inside surface of the lens frame 1"" is not parallel with the optical axis, it repeats reflection and absorption in the clearance between the outside surface of the lens frame 15 to which black painting is applied and the inside surface of the lens frame 1"". Consequently, the amount of light is materially reduced and each ray fails to reach the solid-state image sensor 3.

In the fourth embodiment, as mentioned above, the lens frame 15 is placed in which its outside diameter is larger than that of the optical filter F2 having excitation light cutoff characteristics and the inside diameter of the projection 15a is smaller than the outside diameter of the optical filter F2. Thus, a means of avoiding the production of excitation light traveling in straight lines through the clearance between the outside surface of the optical filter F2 and the inside surface of the lens frame 15 or between the inside surface of the lens frame 1"" and the outside surface of the lens frame 15 is realized by constructing the lens frames 1"" and 15 as holding members. As a result, of all light from the object, only light of particular wavelengths incident on the interference film having excitation light cutoff characteristics, provided on the object-side surface of the optical filter F2, passes through the interference film, and thus excitation light components unnecessary for observation can be eliminated.

Also, it is desirable that a difference in outside diameter between the biconvex lens L2" and the lens frame 15 is at least 0.1 mm and a difference between the outside diameter of the optical filter F2 and the inside diameter of the projection 15a of the lens frame 15 is also at least 0.1 mm. By doing so, it becomes possible to avoid the production of the excitation light traveling in straight lines through the clearance even though manufacturing errors of the lens frame 15 and the biconvex lens L2" or variations of positions of the biconvex lens L2" and the lens frame 15 inside the lens frame 1"" are caused.

The position of the projection 15a of the lens frame 15 is not limited to the arrangement of the fourth embodiment, and the projection 15a may be located close to the optical filter F2 provided with the interference film having excitation light cutoff characteristics, that is, between the biconvex lens L2" and the lens L3. For example, the projection 15a of the lens frame 15 may be interposed between the optical filter F4 and the lens L3. Alternatively, the outside diameter of the optical filter F3 is reduced to about 1.8 mm so that the projection 15a of the lens frame 15 is located at the position of the optical filter F3.

Fifth Embodiment

Figure 10:
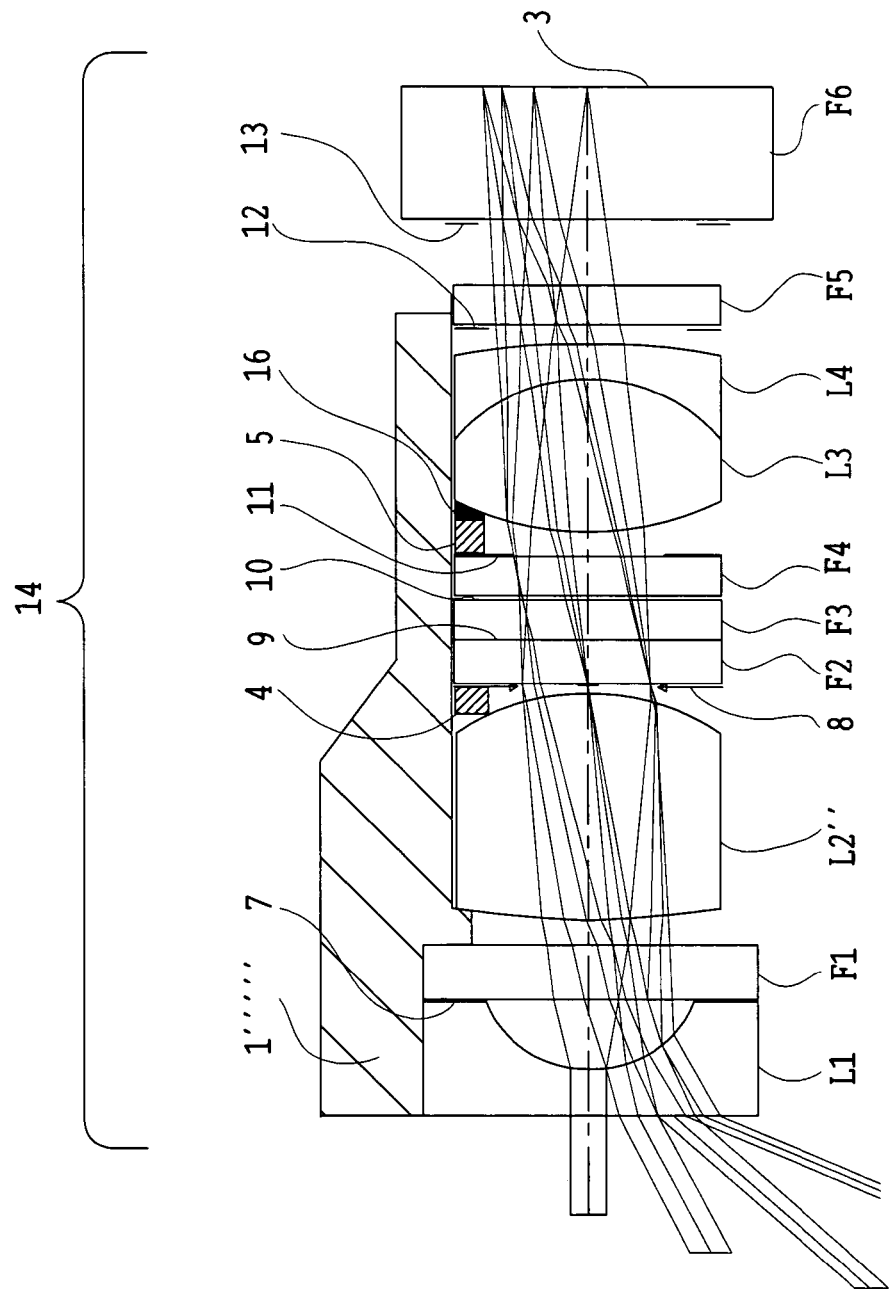
FIG. 10 is a sectional view showing schematically an optical arrangement, developed along the optical axis, of a fifth embodiment of the imaging apparatus for endoscopes according to the present invention.

FIG. 10 shows an optical arrangement of the fifth embodiment of the imaging apparatus for endoscopes according to the present invention.

The imaging apparatus for endoscopes of the fifth embodiment, in contrast with the imaging apparatus for endoscopes of the first embodiment, is such that the outside diameter of the biconvex lens L2" is changed to 2 mm. Further, in order to fill a clearance between the outside surface of the spacer ring 5 and the inside surface of a lens frame 1"", a black adhesive 16 is applied all over the peripheral surface between the spacer ring 5 and the lens L3. The outside diameters of the optical filter F2 having excitation light cutoff characteristics and the biconvex lens L2" located on the object side of the optical filter F2 are both set to 2 mm.

In the imaging apparatus for endoscopes of the fourth embodiment constructed as mentioned above, excitation light refracted in the proximity of the periphery of the image-side curved surface of the biconvex lens L2" becomes parallel with the optical axis and travels in straight lines through the clearance between the outside surfaces of the spacer ring 4, the optical filters F2–F4, and the stops 8–11 and the inside surface of the lens frame 1"". However, the excitation light traveling in straight lines through the clearance is reflected or absorbed and blocked by the black adhesive 16 filling the clearance between the outside surface of the spacer ring 5 and the inside surface of the lens frame 1"".

In the fifth embodiment, as discussed above, the black adhesive is provided to fill the clearance between the outside surface of the spacer ring 5 and the inside surface of the lens frame 1"", and thereby a means of blocking the excitation light traveling in straight lines through the clearance between the outside surface of the optical filter F2 and the inside surface of the lens frame 1"" is realized by constructing a holding frame using the black adhesive. As a result, of all light from the object, only light of particular wavelengths incident on the interference film having excitation light cutoff characteristics, provided on the object-side surface of the optical filter F2, passes through the interference film, and thus excitation light components unnecessary for observation can be eliminated.

The position of the black adhesive 16 is not limited to the arrangement of the fifth embodiment. For example, the black adhesive may be applied between the spacer ring 4 and the biconvex lens L2". It may also be applied between the outside surfaces of the optical filters F2–F4 and the inside surface of the lens frame 1"".

Sixth Embodiment

Figure 21:
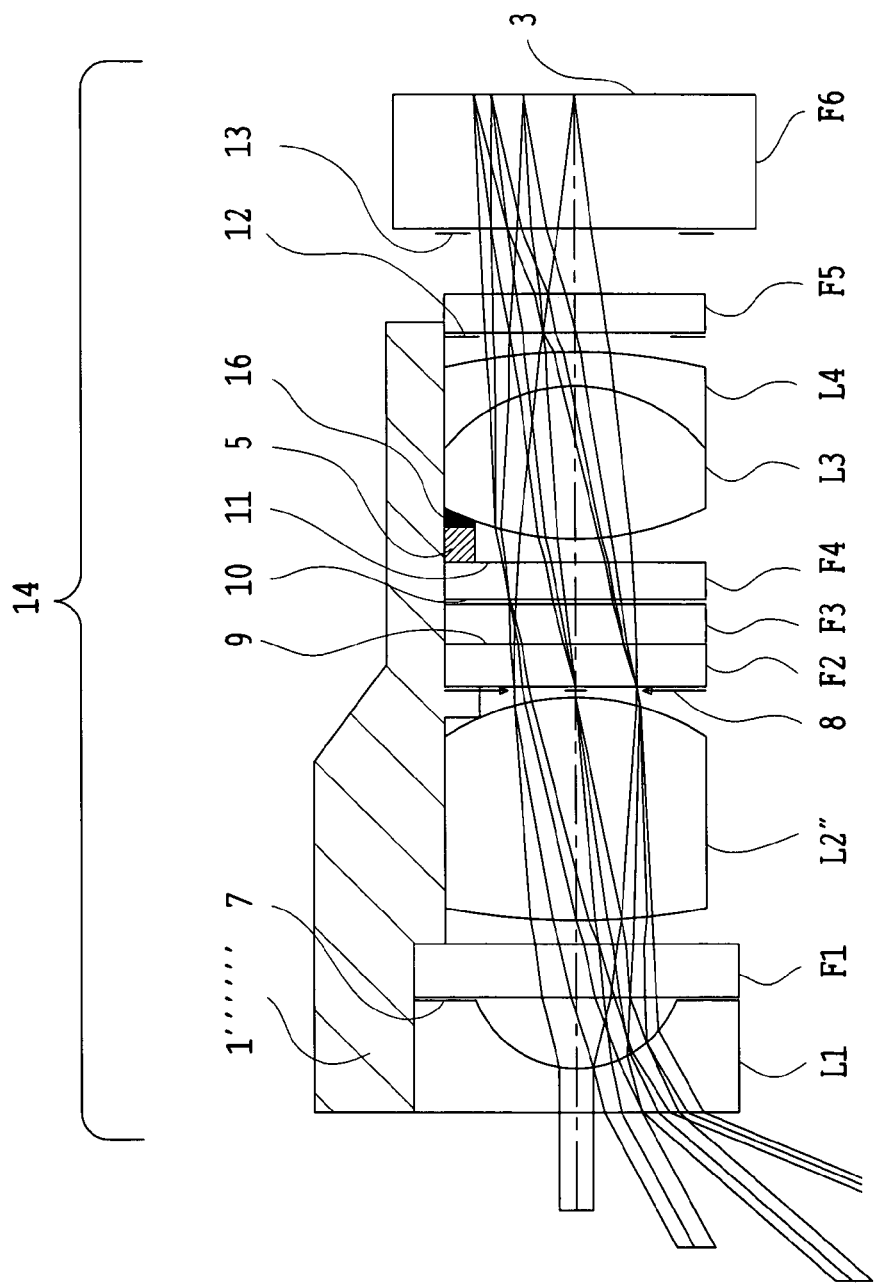
FIG. 21 is a sectional view showing schematically an optical arrangement, developed along the optical axis, of a sixth embodiment of the imaging apparatus for endoscopes according to the present invention.

FIG. 21 shows an optical arrangement of the sixth embodiment of the imaging apparatus for endoscopes according to the present invention. This embodiment has the same arrangement as the fifth embodiment of FIG. 10 with the exception that a lens frame 1''''' constructed integrally with the spacer ring 4 is used.

In the imaging apparatus for endoscopes of the sixth embodiment constructed as mentioned above, rays refracted in the proximity of the periphery of the biconvex lens L2" and rendered nearly parallel with the optical axis of the objective optical system are blocked by a projection interposed between the biconvex lens L2" and the stop 8.

That is, any light reaching the solid-state image sensor 3 passes through the interference film having excitation light cutoff characteristics, provided on the object-side surface of the optical filter F2 passes through the interference film, and thus excitation light components unnecessary for observation can be eliminated.

The sixth embodiment is constructed so that the biconvex lens L2" can be incorporated in the lens frame 1''''' from the side of the lens L1 (the opposite side of the solid-state image sensor 3). Specifically, the outside diameter of 2 mm of the biconvex lens L2" is made almost identical with the inside diameter of the lens frame 1''''' without providing a projection on the inside surface of the lens frame 1''''' between the optical filter F1 and the biconvex lens L2".

The present invention is not limited to the above embodiments, but can be modified as described below. The present invention may be constructed by combining the first to sixth embodiments. Also, lens arrangements are not limited to the above embodiments.

The wavelength region of excitation light, or the wavelength region of the filter placed in the objective optical system is not limited. For example, the transmission wavelength region of the filter placed in the objective optical system may be set to 500–640 nm with respect to the wavelength region 400 to 470 nm of excitation light. Alternatively, the transmission wavelength region of the filter placed in the objective optical system may be set to 500–690 nm with respect to the wavelength region 400 to 440 nm of excitation light. It is desirable that the wavelength region to be used is chosen in accordance with parts (the gullet, stomach, and colon) observed through the endoscope.

An absorption-type optical filter may be used, not to speak of the interference film. In order to deposit the interference film, either the vacuum evaporation method or the ion film-making method may be used. When the ion film-making method is used, it is desirable that the thickness of an optical filter substrate is at least 0.4 mm in order to suppress the deformation of the substrate. The interference film may be provided on the lens surface.

The optical filter is not necessarily used for fluorescence. Filters for cutting off a semiconductor laser beam (wavelength 810–890 nm) used in laser therapy and a YAG laser beam (wavelength 1064 nm) are also applicable.

The lens frame can be variously modified. The contour of the lens frame can also be modified. Chamfering may be taken into account. The spacer ring is capable of introducing various modifications such as chamfering.

When the optical axis of the objective optical system is taken as Z and axes perpendicular to the optical axis Z are taken as X and Y, the object-side surface profile of the optical filter F2 may be expressed as $Z=A(X^3+Y^3)$. By doing so, the depth of field of the optical system, as set forth in Japanese Patent Kokai No. 2000-517, can be enlarged.

Instead of the solid-state image sensor 3, an image fiber may be used.

What is claimed is:

1. An imaging apparatus for endoscopes, comprising:
    an objective optical system forming an image of an object; and
    a holding frame retaining the objective optical system,
    wherein the objective optical system is provided with optical filters which reduce a transmittance in a particular wavelength region of illumination light irradiating the object to 0.1% or less and has light passage preventing means of blocking light passing through a clearance between outside surfaces of the optical filters and an inside surface of the holding frame retaining the optical filters.

2. An imaging apparatus for endoscopes according to claim 1, wherein an outside diameter of an adjacent lens on an object side of the optical filters in the objective optical system is made smaller than outside diameters of the optical filters.

3. An imaging apparatus for endoscopes according to claim 2, wherein the outside diameter of the adjacent lens on the object side of the optical filters is made smaller than the outside diameters of the optical filters by at least 0.1 mm.

4. An imaging apparatus for endoscopes according to claim 1, wherein a holding member whose outside diameter is larger than outside diameters of the optical filters and whose inside diameter is smaller than the outside diameters of the optical filters is placed close to the optical filters.

5. An imaging apparatus for endoscopes according to claim 4, wherein the holding member has the outside diameter larger than the outside diameters of the optical filters by at least 0.1 mm and the inside diameter smaller than the outside diameters of the optical filters by at least 0.1 mm.

6. An imaging apparatus for endoscopes according to claim 4, wherein the holding member is constructed so that spacing between a lens and the optical filters in the objective optical system is set.

7. An imaging apparatus for endoscopes according to claim 4, wherein the holding member is interposed between the optical filters and an adjacent lens on an object side of the optical filters and the outside diameter of the holding member is larger than an outside diameter of the lens.

8. An imaging apparatus for endoscopes, comprising:
    an objective optical system forming an image of an object; and
    a holding frame retaining the objective optical system,
    wherein the objective optical system is provided with an optical filter which reduces a transmittance of excitation light inducing fluorescent light from the object to 0.1% or less and has light passage preventing means of blocking light passing through a clearance between an outside surface of the optical filter and an inside surface of the holding frame retaining the optical filter.

9. An imaging apparatus for endoscopes according to claim 8, wherein an outside diameter of an adjacent lens on an object side of the optical filter in the objective optical system is made smaller than an outside diameter of the optical filter.

10. An imaging apparatus for endoscopes according to claim 9, wherein the outside diameter of the adjacent lens on the object side of the optical filter is made smaller than the outside diameter of the optical filter by at least 0.1 mm.

11. An imaging apparatus for endoscopes according to claim 9, wherein a holding member whose outside diameter is larger than the outside diameter of the optical filter and whose inside diameter is smaller than the outside diameter of the optical filter is placed close to the optical filter.

12. An imaging apparatus for endoscopes according to claim 11, wherein the holding member has the outside diameter larger than the outside diameter of the optical filter by at least 0.1 mm and the inside diameter smaller than the outside diameter of the optical filter by at least 0.1 mm.

13. An imaging apparatus for endoscopes according to claim 11, wherein the holding member is constructed so that spacing between a lens and the optical filter in the objective optical system is set.

14. An imaging apparatus for endoscopes according to claim 11, wherein the holding member is interposed between the optical filter and an adjacent lens on an object side of the optical filter and the outside diameter of the holding member is larger than an outside diameter of the lens.

15. An imaging apparatus for endoscopes according to claim 8, wherein the objective optical system has a plurality of kinds of optical filters and a lens is interposed between at least one kind of optical filter and remaining optical filters.

16. An imaging apparatus for endoscopes according to claim 8, wherein the objective optical system has a plurality of kinds of optical filters and an optical filter reducing a transmittance of illumination light irradiating the object in a particular wavelength region to 0.1% or less is located closest to the object.

* * * * *